(12) United States Patent
Barnes et al.

(10) Patent No.: US 11,288,613 B2
(45) Date of Patent: Mar. 29, 2022

(54) CONSTRUCTION PROJECT PERFORMANCE MANAGEMENT

(71) Applicant: TEXTURA CORPORAITON, Deerfield, IL (US)

(72) Inventors: Jason Barnes, Bloomingdale, IL (US); Mateen Khadir, Chicago, IL (US); Franco Turrinelli, Chicago, IL (US)

(73) Assignee: TEXTURA CORPORATION, Redwood Shores, CA (US)

( * ) Notice: Subject to any disclaimer, the term of this patent is extended or adjusted under 35 U.S.C. 154(b) by 94 days.

(21) Appl. No.: 15/325,454

(22) PCT Filed: Feb. 6, 2015

(86) PCT No.: PCT/US2015/014832
§ 371 (c)(1),
(2) Date: Jan. 11, 2017

(87) PCT Pub. No.: WO2016/007199
PCT Pub. Date: Jan. 14, 2016

(65) Prior Publication Data
US 2017/0161657 A1 Jun. 8, 2017

Related U.S. Application Data

(60) Provisional application No. 62/023,489, filed on Jul. 11, 2014.

(51) Int. Cl.
*G06Q 10/06* (2012.01)
*G06Q 50/08* (2012.01)

(52) U.S. Cl.
CPC ..... *G06Q 10/0639* (2013.01); *G06Q 10/0633* (2013.01); *G06Q 50/08* (2013.01)

(58) Field of Classification Search
CPC ... G06Q 50/08; G06Q 10/639; G06Q 10/0633
(Continued)

(56) References Cited

U.S. PATENT DOCUMENTS 7,853,472 B2  12/2010  Al-Abdulqader et al.
7,877,321 B2  1/2011  Allin et al.
(Continued)

FOREIGN PATENT DOCUMENTS

CN  103136626 A  6/2013

OTHER PUBLICATIONS

Kappelman LA, McKeeman R, Zhang L. Early Warning Signs of It Project Failure: The Dominant Dozen. Information Systems Management. 2006;23(4):31-36. doi:10.1201/1078.10580530/46352.23. 4.20060901/95110.4 (Year: 2006).*
(Continued)

*Primary Examiner* — Charles Guiliano
*Assistant Examiner* — Thea Labogin
(74) *Attorney, Agent, or Firm* — Kraguljac Law Group, LLC

(57) ABSTRACT

Methods and systems for evaluating entities involved in a construction project. One system includes a server that has access to a plurality of events associated with a construction project, including completion events and accounting events. The server communicates with a computing device over a network connection and includes a processing unit. The processing unit is configured to receive a triggering event selected by a first entity and automatically identify when the plurality of events includes the selected triggering event. When the selected triggering event is included in the plurality of events, the processing unit is configured to automatically prompt a user to complete an evaluation for a second entity, receive the completed evaluation from the user, and make an aggregation of the completed evaluation
(Continued)

available to the first entity, the second entity, and a third entity.

20 Claims, 25 Drawing Sheets

(58) Field of Classification Search
USPC .................................................. 705/7.38
See application file for complete search history.

(56) References Cited

U.S. PATENT DOCUMENTS

| | | | |
|---|---|---|---|
| 8,489,501 | B2 | 7/2013 | Allin et al. |
| 8,706,569 | B2 | 4/2014 | Al-Abdulqader et al. |
| 2002/0082889 | A1* | 6/2002 | Oliver ............... G06Q 10/06 705/7.17 |
| 2002/0099578 | A1* | 7/2002 | Eicher, Jr. ........... G06Q 10/06 705/7.39 |
| 2006/0149604 | A1* | 7/2006 | Miller ............... G06Q 10/067 705/348 |
| 2008/0114628 | A1* | 5/2008 | Johnson ......... G06Q 10/06311 707/792 |
| 2008/0294505 | A1* | 11/2008 | Markowitz ...... G06Q 10/06312 705/7.22 |
| 2009/0037869 | A1* | 2/2009 | Hamilton ............. G06Q 10/00 717/100 |
| 2010/0250322 | A1* | 9/2010 | Norwood ............ G06Q 10/103 705/7.21 |
| 2010/0299171 | A1* | 11/2010 | Lau ..................... G06Q 10/06 705/7.15 |
| 2012/0072252 | A1* | 3/2012 | Deegan ................ G06Q 10/06 705/7.11 |
| 2013/0339831 | A1* | 12/2013 | Gulanikar ...... G06Q 10/06314 715/210 |
| 2014/0207605 | A1* | 7/2014 | Allin ..................... G06Q 50/08 705/26.4 |
| 2014/0278662 | A1* | 9/2014 | Reed ................ G06Q 10/0631 705/7.17 |
| 2015/0006393 | A1 | 1/2015 | Allin et al. |

OTHER PUBLICATIONS

China National Intellectual Property Administration, Office Action issued in Chinese Patent Application No. 201580046385.8, dated Jan. 20, 2020.

* cited by examiner

| Projects | | | | | + New Project |
|---|---|---|---|---|---|
| Project | Contracts | Pending Evals. | Last Activity | Owner | Status ↑ |
| The Pines at Fair Oaks | 0 | 0 | 3-Mar-2014 by John Doe | John Doe | Pending |
| Houston General Hospital | 22 | 25 | 14-Jun-2014 by Jane Doe | Jane Doe | In Progress |
| Wolf Point | 102 | 0 | 28-Jun-2014 by Jack Doe | Jack Doe | Complete |
| 300 S. Riverside Plaza | 68 | 0 | 28-Jun-2014 by Jill Doe | Jill Doe | Complete |

| Templates | | | | 620 + New Template 622 |
|---|---|---|---|---|
| Name | Description | Created ↑ | Owner | Projects |
| Midwest Construction | This template should be used in projects where contracts are generally less than $100M. It is shorter to complete since the downside risk is lessened based on the contracts being smaller. | 3-Mar-2014 | John Doe | 4 |
| Midwest Contract Complete | This template should be used in projects where contracts are generally greater than $100M. It is longer to complete since it asks additional questions because of the downside risk of larger contracts. | 14-Jun-2014 | Jason Doe | 4 |
| East Construction | This template should be used in projects where contracts are generally greater than $100M. It is longer to complete since it asks additional questions because of the downside risk of larger contracts. | 28-Jun-2014 | Jennifer Doe | 10 |
| East Contract Complete | This template should be used in projects where contracts are generally greater than $100M. It is longer to complete since it asks additional questions because of the downside risk of larger contracts. | 28-Jun-2014 | Jeffery Doe | 10 |

FIG. 10

Add Question — 642

Question Type: Quality

| Question | Answer Type | |
|---|---|---|
| How would you rate the involvement of the partner's project management staff? | Bad-Good (1-5) | Select |
| How close did the delivered product(s) perform to expectation? | Bad-Good (1-5) | Select |
| How accurate and timely were any necessary repairs or reconfigurations? | Bad-Good (1-5) | Select |
| How close did the partner conform with specifications, drawings and other requirements? | Bad-Good (1-5) | Select |
| How high of a quality was the equipment the partner used during construction? | Bad-Good (1-5) | Select |
| How high of quality were the jobsite craft personnel? | Bad-Good (1-5) | Select |

644 — 640

Close

FIG. 13

Standard Template

Owner
John Doe

Template Description
This template should be used in projects where contracts are generally less than $100M. It is shorter to complete since the downside risk is lessened based on the contracts being smaller.

☐ Raise red flag alertz when the overall rating is [< 2 ▾] ← 663

≡ Management
 ≡ How would you rate the involvement of the partner's project management staff? 1-5 ☐ Required
 ≡ How would you rate the management staff of the partner? 1-5 ■ Required [< 2 ▾]
≡ Timeliness
 ≡ How well did the partner meet the schedule of deliverables established at the beginning of the project? 1-5 ☐ Required
 ≡ How well did the vendor conform with schedule of work progress in order to meet the planned completion dates for Final Completion? 1-5 ☐ Required
≡ Safety
 ≡ How would you rate the partner's safety processes and manuals? 1-5 ☐ Required
 ≡ How would you rate the partner's onsite safety throughout the project? 1-5 ☐ Required
≡ Quality
 ≡ How would you rate the quality of work completed by the partner? 1-5 ☐ Required
 ≡ How would you rate the partners ability to quickly react and fix quality issues? 1-5 ☐ Required 660  662a 662b ≡ Add Heading — 636
≡ Add Question — 638

Drag here to remove

Close
Close

Construction Evals — 700

| | | | | | | | |
|---|---|---|---|---|---|---|---|
| Template | Trigger | | Status | | | | ○ Edit |
| Standard Template | Construction 20% | | Active | | | | |
| Contract | Participant | Evaluations | Rating | Added | Last Activity↑ | | |
| 123-648 | A.B. Flooring | 4/4 Completed | 2.69 | 10-Jun-2014 | 24-Jun-2014 | | |
| 123-585 | J.B. Roofing | 2/4 Completed | 3.24 | 10-Jun-2014 | 18-Jun-2014 | Reassign Review Cancel | |
| 123-549 | Hot & Cold HVAC | 1/4 Completed | 3.85 | 10-Jun-2014 | 16-Jun-2014 | Reassign Review Cancel | |
| 123-594 | M & L Plumbing | 0/4 Completed | - | 10-Jun-2014 | 10-Jun-2014 | Reassign  Cancel | |

Evaluations — 758

760 — < Previous | Reviews 2 | Alerts 0 | Next >

761:
- R.K. Flooring  123 Main St. 123-ABC  10d details
  Project Manager: Thomas Johnston
  Partner Contract: Jules Verne
- A.M. Roofing  123 Main St. 123-EDF  10d details
- J.K. Supply  Houston General Hos. H123-EDF  1d details
- A.M. Concrete  Houston General Hos. H123-EDF  1d details
- M.K. Excavation  Houston General Hos. H123-ED0  1d details
- F.T. Electric Contractor  H123-ED1  1d details < Previous | Next >

[Submit] [Save] [Reset] [Close]

Management

How would you rate the involvement of the partner's project management staff?
☐  ○N/A  ○1  ○2  ○3  ○4  ○5

How would you rate the management staff of the partner?
☐  ○N/A  ○1  ○2  ○3  ○4  ○5

Timeliness

How well did the partner meet the schedule of deliverables established at the beginning of the project?
☐  ○N/A  ○1  ○2  ○3  ○4  ○5

Did the partner conform with schedule of work progress in order to meet the planned completion dates for Final Completion?
☐  ○N/A  ○1  ○2  ○3  ○4  ○5

Safety

How would you rate the partner's safety processes and manuals?
☐  ○N/A  ○1  ○2  ○3  ○4  ○5

How would you rate the partner's onsite safety throughout the project?
☐  ○N/A  ○1  ○2  ○3  ○4  ○5

Evaluations

| Evaluator | Project | Partner | Status | Rating | Red Flagged | Trigger | Age | |
|---|---|---|---|---|---|---|---|---|
| John Doe | 123 Main St. | R.K. Flooring | Pending | | | 50% Complete | 10d | Evaluate |
| Jane Doe | Houston General Hospital | A.M. Roofing | Matching | | | 50% Complete | 1d | |
| John Doe | Houston General Hospital | J.K. Supply | Pending | | | 50% Complete | 5d | |
| John Doe | 123 Main St. | J.H. Concrete | Complete | 4.25 | | 50% Complete | | View |
| John Doe | 123 Main St. | J.S. Siding | Complete | 2.45 | ▬ | 50% Complete | | View |

Partner Rating Report      DD-MMM-YYYY - DD-MMM-YYYY  ← 840

| Partner | Safety | Quality | Timeliness | Payments | Overall |
|---|---|---|---|---|---|
| ▸ F.T. Concrete | 5.00 | 4.60 | 3.80 | 5.00 | 4.47 |
| ▾ J.B. Flooring | 5.00 | 2.80 | 1.80 |  | 3.23 |
|   123 Main St. | 5.00 | 1.20 | 1.00 |  | 2.40 |
|   567 S. Centre St. | 5.00 | 3.00 | 2.80 |  | 3.60 |
|   1405 Lake Cook | 5.00 | 4.20 |  |  | 4.60 |
| ▸ A.B. Roofing | 3.25 | 2.25 | 1.75 | 1.25 | 2.13 |
| ▸ Bob's Ceiling Haners & Suppl... | 4.50 | 3.30 | 2.75 | 4.20 | 3.69 |
| ▸ ABC Toilet Supply | 4.40 | 3.75 | 4.90 | 2.80 | 4.00 |
| ▸ Winn Windows | 2.60 | 1.60 | 3.60 | 3.10 | 2.73 |
| ▸ Big Al's Excavation | 4.50 | 4.90 | 4.75 | 3.80 | 4.49 |
| ▸ Pete's Pipers | 2.50 | 3.55 | 2.75 | 3.66 | 3.11 |
| ▸ E.T. Communications | 3.90 | 4.49 | 3.99 | 4.12 | 4.13 |
| ▸ Eli's Electrical | 4.19 | 1.78 | 1.25 | 2.50 | 2.43 |
| ▸ Chicago Fire Systems | 3.10 | 1.40 | 2.10 | 1.80 | 2.05 |

Evaluator Report — 900

| User/Project | Completeness | Avg. Length | Avg. Age | Avg. Rating | No. Completed |
|---|---|---|---|---|---|
| ▶ John Doe | 80% | 123s | 23d | 3.85 | 8 |
| ▼ Jane Doe | 50% | 145s | 45d | 3.56 | 4 |
| 123 Main St. | 100% | 132s | 67d | 3.75 | 2 |
| 567 S. Centre St. | 50% | 158s | 23d | 3.37 | 2 |
| 1405 Lake Cook | 0% | N/A | N/A | N/A | 0 |

DD-MMM-YYYY - DD-MMM-YYYY

FIG. 25

CONSTRUCTION PROJECT PERFORMANCE MANAGEMENT

RELATED APPLICATIONS

This application is a National Entry of International Application No. PCT/US2015/014832, filed Feb. 6, 2015, which claims priority to U.S. Provisional Application No. 62/023,489, filed Jul. 11, 2014, the entire contents of both applications are incorporated by reference herein.

BACKGROUND

Construction projects often involve a number of entities (e.g., a project owner, a general contractor, and one or more subcontractors, material suppliers, or other vendors). An entity managing a construction project (e.g., a project owner or general contractor) often wants to know how other entities (e.g., subcontractors and material suppliers) are performing to ensure that a project is handled properly. In addition, entities may be interested in obtaining information showing how they are performing on a construction project relative to their peers.

SUMMARY

Although manual evaluation processes exist, these processes are difficult to manage, time-consuming, and error-prone. In particular, an entity must manually remember to request evaluations in a timely and purposeful manner. For example, evaluations for a subcontractor should ideally be completed when the subcontractor's portion of the project is complete and not when the entire project is complete (which may be months or even years after the subcontractor's portion is complete).

Furthermore, as traditional manual evaluation processes are based solely on information maintained for one entity, it is not possible for the entity to tie an evaluation request to particular events when the events occur (as compared to when the entity is eventually notified of the event). Similarly, as construction project data is commonly tracked by multiple separate systems (e.g., project management systems and accounting systems), there was previously not a single source of information readily available that would provide the needed insight to automatically trigger evaluations at any point in a construction management workflow. Furthermore, as traditional manual evaluation processes are based solely on information maintained for one entity, it is not possible for entity to tie an evaluation request to particular events when the events occur (as compared to when the entity is eventually notified of the event). Similarly, as construction project data is commonly tracked by multiple separate systems (e.g., project management systems and accounting systems), there is not a single source of information readily available that would provide the needed insight to automatically trigger evaluations at any point in a construction management workflow. Furthermore, even if a fully automated method of requesting evaluations was available, such a method would prevent an entity from requesting evaluations on an ad-hoc basis as issues arise, which is common in a complex construction project.

Furthermore, entities typically only used evaluations for internal business purposes. Accordingly, the entity being evaluated typically does not receive the result of the evaluation, which the entity could use to improve its service and/or products. Similarly, even if the entity being evaluated received the result of the evaluation, the entity could not readily identify how its evaluation compared to other entities. In fact, given that each entity traditionally used it is own evaluation form, entities would likely be unable to share evaluation data with other entities in a meaningful way due to incompatible evaluation forms or processes between entities.

Therefore, embodiments of the invention provide systems and methods for managing evaluations relating to construction project performance. In some embodiments, the systems and methods automatically prompt individuals for evaluations in response to events associated with a construction project. The events can be manually selected to provide a custom evaluation process for a construction project. The events triggering an evaluation can be defined on a per-project basis or other basis (e.g., an entity-basis). Completed evaluations can be aggregated and provided to entities (e.g., a project owner or general contractor), which allows the entities to see how other entities are performing and make changes as desired. In some embodiments, the aggregated data can be used to compare entities serving similar roles, which allows entities to make informed decisions regarding what entities to use on particular projects and to minimize risk once a project starts. This aggregated data may also be used to provide entities with information showing how they are performing relative to their peers, which entities can use to make internal performance improvements. Entities can also access completed, non-aggregated evaluations, which entities can use to identify and address specific problems.

Embodiments of the invention can provide a networked computer system including a server that stores project information and processes information according to stored workflows. Users can access the server (e.g., using a computing device that accesses the server through one or more network connections) to configure an evaluation process, complete evaluations, review and submit evaluations, and view collected and/or aggregated evaluation data.

Some embodiments of the invention provide a method for evaluating an entity involved in a construction project. The method includes receiving, through a user interface, a selection of a triggering event from a user. The method also includes automatically, with a processing unit, processing construction project data to identify when the triggering event occurs, and, when the event occurs, automatically, with the processing unit, initiating an evaluation for the entity. Triggering events can include, but are not limited to, a calendar event (e.g., a date and/or a time), a phase in the construction project, a completion percentage, and/or an occurrence of a field issue. The construction project data can be accessed through one or more systems, such as a payment management system, a project management system, a field issue management system, a design management system, a prequalification management system, and/or a bid management system. Embodiments of the invention can interface with these other systems through shared workflows and shared data.

Initiating the evaluation can include generating a notification and transmitting the notification to one or more users. Completed evaluations can optionally be reviewed by a user different from the user who completed the evaluation and the user reviewing a completed evaluation can accept or reject the evaluation (e.g., as a whole or partially). Completed evaluations can also be aggregated with other evaluations for the same entity or project.

Some embodiments of the invention also receive an evaluation template from a user and, optionally, receive an alert threshold for the template. Upon receiving a completed evaluation based on the template, the alert threshold can be automatically applied to the completed evaluation (e.g., the entire evaluation and/or particular questions included in the evaluation) and a notification can be generated when the completed evaluation meets or exceeds the alert threshold. A completed evaluation meeting or exceeding the alert threshold can also be selected as a triggering event to automatically initiate another evaluation.

Embodiments of the invention can also provide a system (e.g., including one or more servers communicating with one or more user devices over one or more network connections) and computer-readable medium encoded with instructions for carrying out the method described above or portions thereof.

For example, one embodiment of the invention provides a system for evaluating entities involved in a construction project. The system includes a server that has access to a plurality of events associated with a construction project, the plurality of events created based on project data provided by a plurality of entities associated with the construction project during a duration of the construction project, wherein the plurality of events includes completion events of the construction project and accounting events of the construction project. The server is configured to communicate with a computing device over a network connection and includes a processing unit. The processing unit is configured to receive, from the computing device, a triggering event selected by a first entity of the plurality of entities from a list of available triggering events, the list of available triggering events including completion events and accounting events, and automatically identify when the plurality of events includes the selected triggering event. The processing unit is further configured, when the selected triggering event is included in the plurality of events, to automatically prompt a user to complete an evaluation for a second entity of the plurality of entities, receive the completed evaluation from the user, and make an aggregation of the completed evaluation available to the first entity, the second entity, and a third entity of the plurality of entities.

Other aspects of the invention will become apparent by consideration of the detailed description and accompanying drawings.

BRIEF DESCRIPTION OF THE DRAWINGS

FIGS. 6-8 are screen shots illustrating user interfaces that allow a user to create an evaluation project.

FIGS. 10-14 are screen shots illustrating user interfaces for configuring an evaluation template.

FIG. 15 is a screen shot illustrating a user interface for monitoring evaluations.

FIG. 17 is a screen shot illustrating a user interface for completing an evaluation.

FIG. 18 is a screen shot illustrating a user interface for reviewing a completed evaluation.

FIG. 19 is a screen shot illustrating a user interface for viewing a notification associated with a completed evaluation.

FIG. 20 is a screen shot illustrating a user interface for viewing evaluations.

FIG. 23 is a screen shot illustrating an individual partner network report.

FIG. 25 is a screen shot illustrating an evaluator report.

DETAILED DESCRIPTION

Before any embodiments of the invention are explained in detail, it is to be understood that the invention is not limited in its application to the details of the configuration and arrangement of components set forth in the following description or illustrated in the accompanying drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

Figure 1:
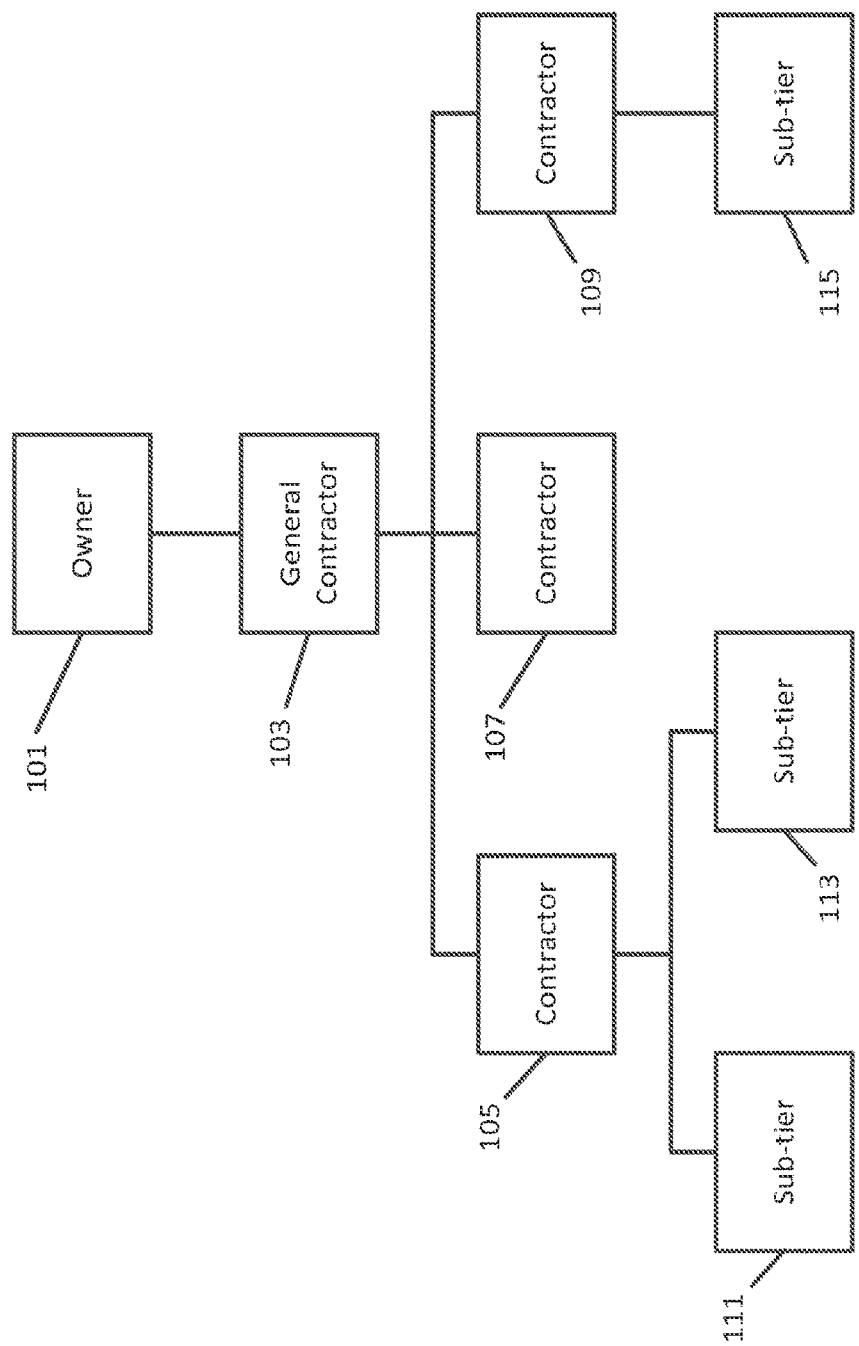
FIG. 1 schematically illustrates an example of a hierarchically-organized construction project.

FIG. 1 illustrates an example of a hierarchically-organized construction project. The construction project is organized in support of an owner 101 of a project. The owner (or developer) 101 is typically the entity that ultimately puts the building to use (e.g., either by occupying, leasing or selling it). A general contractor ("GC") 103 is contracted to manage the overall project. The GC 103 also assumes a contractual responsibility for the delivery of the project and, in some cases, may play a role in the construction activities by self-performing some of the required construction. A GC 103 typically has a one-to-many relationship with projects. In other words, a single GC may manage multiple concurrent projects but each of those projects is typically managed by a single GC. However, projects may be managed by multiple GCs, including GCs performing as a joint venture or other combined entity.

The GC 103 will engage one or more contractors 105, 107, 109 to perform various construction specialties or to provide required materials for the project. The contractors (for example, subcontractors, material suppliers, and other vendors) work under the GC 103 to form a strict contractual hierarchy for the construction project. Each contractor 105, 107, 109 may engage one or more additional contractors 111, 113, 115 (e.g., sub-tier contractors, material suppliers, and other vendors), who provide services, equipment, labor, or materials under contract to the project.

As described above, project managers (e.g., GCs, project owners, etc.) often want to evaluate other entities involved in a construction project (referred to interchangeably herein as "entities," "partners," or a "partner network") (e.g., vendors, subcontractors, and material suppliers) to help mitigate performance and risk issues and to select the best entities to work with, to work better with existing entities, and to decide whether to continue working with existing entities on future projects. Therefore, project managers want to effectively capture and distribute partner performance information. However, project managers lack centralized and uniform tools and processes to perform effective evaluations. Furthermore, when performance data is recorded at a project level, it lacks completeness and is not easily shareable, which creates information silos. Furthermore, project managers do not have key metric reporting for their partner network to make informed decisions regarding what partners to use or when to address a poorly-performing partner.

For example, project managers typically have to provide supervisors with paper-based evaluation forms that are difficult for either party to track and, therefore, are often not completed. In addition, if a project manager receives any completed evaluations, the evaluations are often retained in paper form, which makes aggregation and comparison difficult. Accordingly, even if a project manager can get feedback regarding a particular partner, the feedback cycle is manual (and, therefore, long) and provides little actionable information.

Accordingly, embodiments of the invention provide methods and systems for managing, distributing, and collecting evaluations for measuring the quality of a partner network throughout a construction project and across construction projects. The systems and methods can provide a centralized solution that allows users to make better decisions regarding partners (which leads to reduced risk and costs), quickly complete and find evaluations for a partner network, and configure, manage, and track an evaluation program or process. Therefore, embodiments of the invention decrease organizational risk and increase operational effectiveness through visibility into partner performance information. Embodiments of the invention also increase program control effectiveness through centralized administration, distribution, collection, and reporting. Embodiments of the invention also allow for collecting objective data relating to the performance of partners in a construction project and an evaluation process itself.

Figure 2:
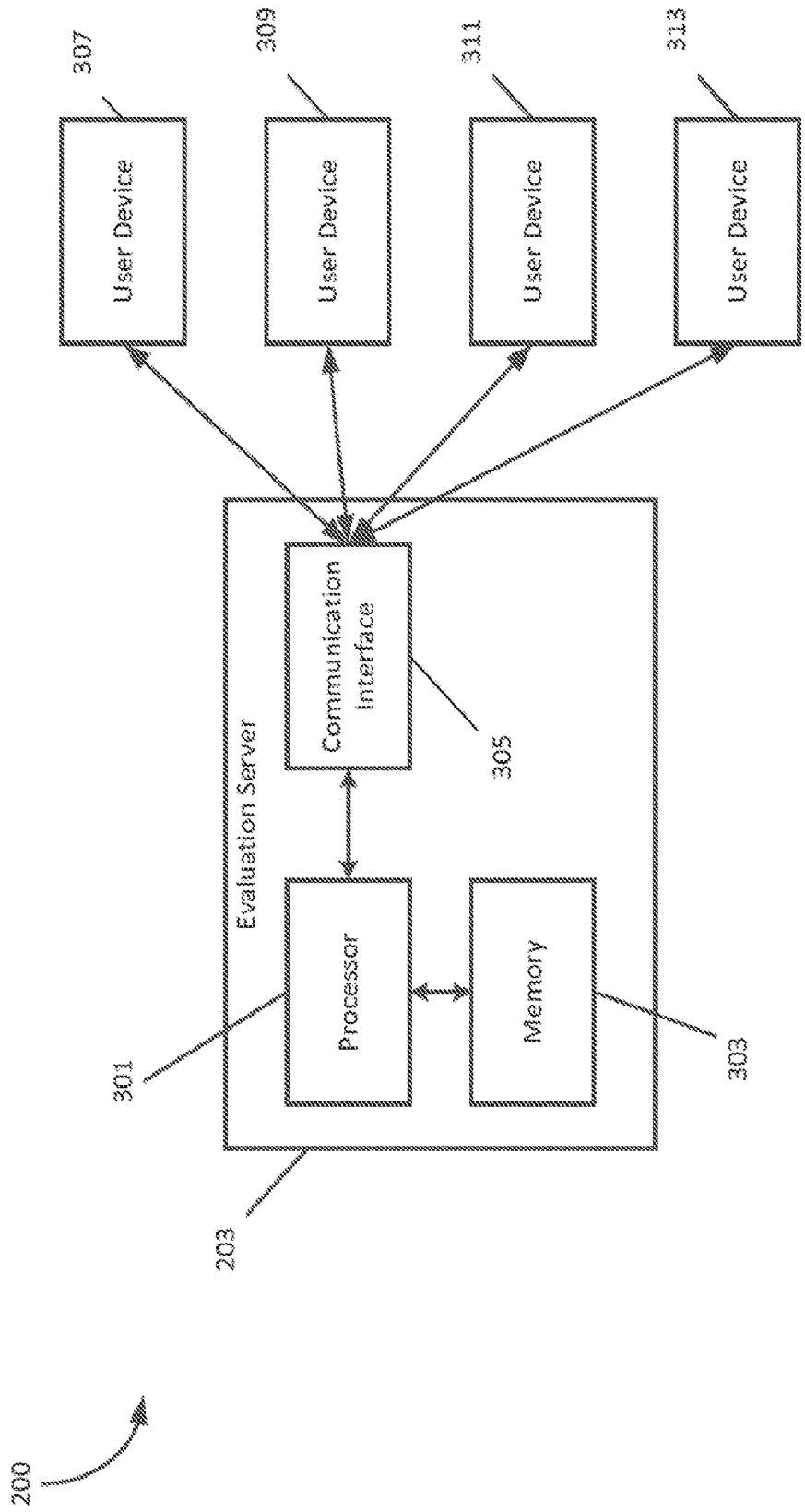
FIGS. 2-4 schematically illustrate systems for managing an evaluation process.

As noted above, embodiments of the invention can provide a system for managing a partner performance evaluation process. For example, FIG. 2 illustrates an evaluation system 200 for managing a partner performance evaluation process. The evaluation system 200 can include an evaluation server 203. As illustrated in FIG. 2, the evaluation server 203 can include one or more processing units 301 (e.g., a microprocessor), one or more computer-readable memory modules 303 (e.g., including non-transitory memory, such as random access memory and/or read-only memory), and a communication interface 305. It should be understood that in some embodiments the evaluation server 203 includes additional components. It should also be understood that, in some embodiments, the functionality provided by the evaluation server 203 as described below can be distributed among multiple servers. It should also be understood that functionality described herein as being performed by the evaluation system 200 (or the system 400) can, in some embodiments, be performed by the evaluation server 203 executing computer-readable instructions using the one or more processing units 301.

The evaluation server 203 communicates with one or more external devices through the communication interface 305. The external devices can include user computing devices 307, 309, 311, 313 (e.g., personal computers, laptop computers, tablet computers, smart phones, smart watches, smart televisions, and any other computing device that can communicate with the server 203). In some embodiments, the user computing devices communicate with the evaluation server 203 through a specialty software application stored on the computing device (e.g., a mobile application or "app") and/or through a portal to the server accessed through a browser application stored on the computing device. It should be understood that the evaluation server 203 can communicate with the external devices using a wired or wireless connection (e.g., the Internet). For example, in some forms and arrangements, the system 200 is implemented as an Internet-based web server that is accessible by any device with an Internet connection.

Figure 3:
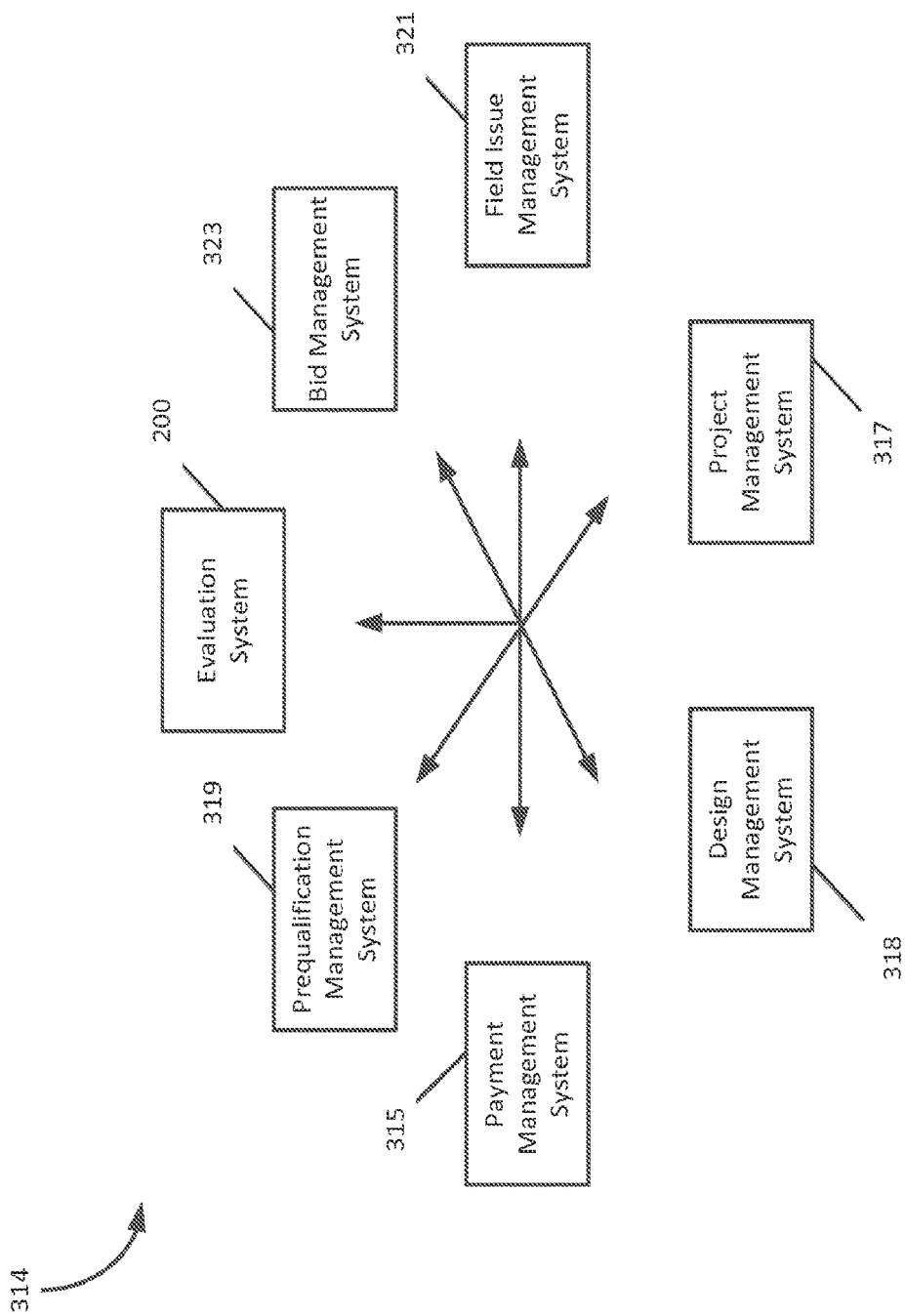

FIG. 3 illustrates an integrated construction management system 314 for managing a partner performance evaluation process. The system 314 includes the evaluation system 200 and also includes other systems for managing various aspects of a construction project. For example, as illustrated in FIG. 3, the system 314 includes a payment management system 315, a project management system 317, a design management system 318, a prequalification management system 319, a field issue management system 321, and/or a bid management system 323. It should be understood that these systems 315, 317, 318, 319, 321, and 323 can include one or more servers and other databases and devices (e.g., accessible by the evaluation server 203 over one or more wired or wireless connections). In some forms and arrangements, the system 314 is implemented as an Internet-based web server that is accessible by any device with an Internet connection.

While the various components of the integrated construction management system 314 as illustrated in FIG. 3 are shown as separate, distinct components, in some forms and arrangements, the various functional features of the system 314 (i.e., functional features provided by the evaluation system 200, the payment management system 315, the project management system 317, the design management system 318, the prequalification management system 319, the field issue management system 321, and/or the bid management system 323) are implemented as a single web-server. In either embodiment, the servers are specially programmed to perform all of the functions required to achieve the benefits of the system 314.

It should be understood that evaluation process and related functionality described herein can be performed by the evaluation system 200 or the integrated construction management system 314 (interchangeably and collectively referred to as the "system 400" in the present document). Furthermore, it should be understood that the system 400 can be configured in various combinations and distributions and the arrangements illustrated in FIGS. 2 and 3 are provided as examples.

Figure 4:
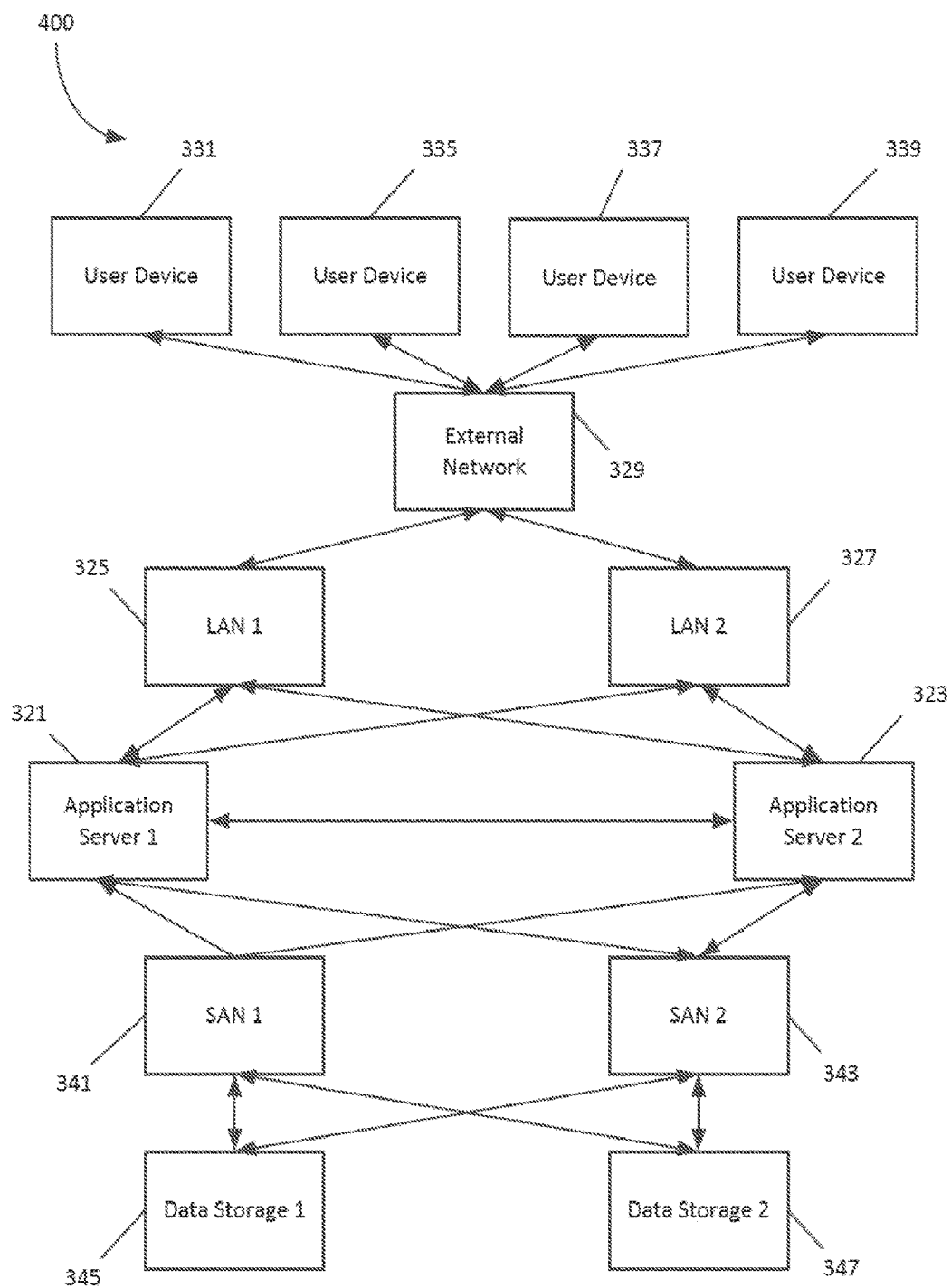

FIG. 4 illustrates a networked environment for implementing the system 400. For example, as illustrated in FIG. 4, a pair of application servers 321, 323 are accessible to users and provide the functionality described herein. In this example, the application servers 321, 323 provide redundant functionality and serve to enable more reliable processing of requests and usage from numerous users concurrently. The application servers 321, 323 are connected to two redundant local area networks 325, 327 that work with the application servers 321, 323 to provide load balancing and work queuing. The local area networks 325, 327 are connected to an external network 329 such as, for example, the Internet or an extranet. User devices 331, 335, 337, 339 access the functionality provided by the servers 321, 323 through the external network 329.

The application servers 321, 323 are also connected to two redundant storage area networks 341, 343. The application servers 321, 323 are able to access data stored on a plurality of data storage devices 345, 347 through either of the storage area networks 341, 343. In some embodiments, the multiple data storage devices 345, 347 are redundant and are synchronized on a regular schedule. In some forms and arrangements of the system 400, each data storage device is associated with a different functional component of the system 400. For example, for the integrated construction management system 315, data storage device 345 may store evaluation data associated with the evaluation system 200 while the data storage device 347 stores project budget data and invoice generation data associated with the payment management system 315. In such arrangements, additional data storage devices coupled to the storage area networks 341, 343 are provided to store data associated with other functional components of the system 400. By using multiple redundant application servers and networks (both local area networks and storage area networks), the system 400 is able to implement a single "point of entry" for the user devices to access the system while also properly balancing the loads and work queues. Users and system activity are automatically transferred from one server to another upon failure or overload of the application server. This mechanism maintains transaction and data integrity through shared memory and persisted data. Furthermore, the data stored on the data storage devices is backed up for each component at multiple data center locations such that, in the event of a loss of a data center, service can continue to be provided and the integrity of the data is not compromised.

In some embodiments, users accessing the system 400 are assigned a user role. User roles can be associated with different permissions or rights within the system 400 that allow a user to perform various tasks. User interfaces provided by the system 400 can also be adapted to particular user roles (e.g., user, project administrator, project executive, executive, etc.). Accordingly, the system 400 can be configured to identify the role assigned to a particular user and determine, based on the assigned role, (1) whether the user is authorized to access a particular user interface or associated functionality and, if the user is authorized, (2) what particular user interface should be displayed to the user.

The system 400 can store evaluation data (e.g., triggering events, evaluation templates, completed evaluations, etc.). The system 400 (e.g., the evaluation server 203) also stores and executes software for managing an evaluation process. For example, the software for managing an evaluation process can provide evaluation workflow management (e.g., evaluate, review, alert, etc.), administration capabilities to centrally manage the performance evaluation process, trigger management for initiating evaluations, data sharing (e.g., project, contract, rating, etc.), business insights through reporting and dashboards, 360° performance evaluations to allow evaluation of evaluators, management of evaluations, reviews, and alerts through mobile devices (e.g., smart phones, tablet computers, etc.), and competitive intelligence through aggregated insights (e.g., how a particular subcontractor compares against an aggregated set of similar subcontractors, how a particular subcontractor performs over time, how a general contractor's partner network compares against an aggregated set of other partner networks, industry performance, etc.). In particular, evaluation data for particular partners can be compared to evaluation data for other partners associated with the same trade or type of work, the same locale, the same organization type (e.g., design vs. engineer vs. subcontractor, etc.), time, project type (e.g., hospital vs. school vs. commercial, etc.), and/or any other characteristics managed for a construction project or customized by a user.

For example, some embodiments of the invention provide automated triggering of evaluations. In particular, partner performance evaluations can be initiated by the system 400 at various times during a construction project. As one example, the system 400 can process construction project data (e.g., stored by the evaluation system 200 or accessed through another system, such as a payment management system 315) to identify a "contract percentage complete." The system 400 can then generate requests for evaluations when certain percentages are reached for a project or contract. Similarly, the system 400 can trigger evaluations based on project phases or dates, contract status, design status, bid phase completion, and/or project issues, such as safety or quality issues.

Figure 5:
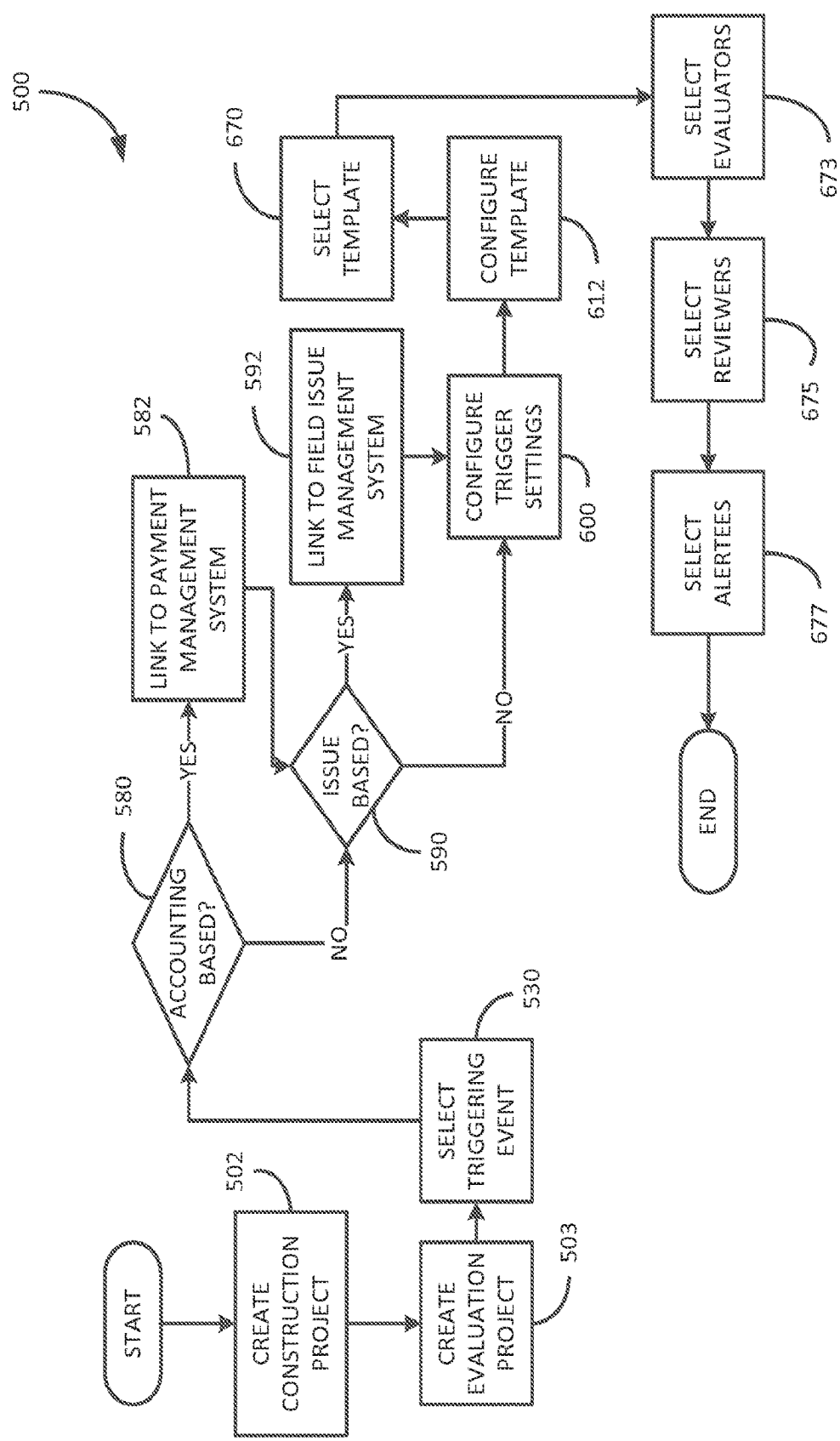
FIG. 5 is a flow chart illustrating a method for configuring an evaluation project performed using the systems of FIGS. 2-4.

For example, FIG. 5 illustrates a method 500 of configuring an evaluation project performed by the system 400. As illustrated in FIG. 5, in some embodiments, an evaluation project is configured on a per-construction-project basis. Accordingly, in such embodiments, a construction project is initially defined (e.g., by a project administrator) (at block 502) and is used as the base of an evaluation project (at block 503). It should be understood that the construction project can be initially defined using the evaluation system 200 or another system (e.g., a project management system 315). If a separate system is used to define the construction project, the evaluation system 200 can be configured to communicate with the separate system to access relevant construction project data. For example, the evaluation system 200 can define an evaluation project for an existing construction project and can receive an identifier for the existing construction project, which the evaluation system 200 uses to access data needed to perform evaluations. However, it should be understood that an evaluation project can also be defined or configured through the evaluation system 200 independent of any project data managed by other systems.

Figure 7:
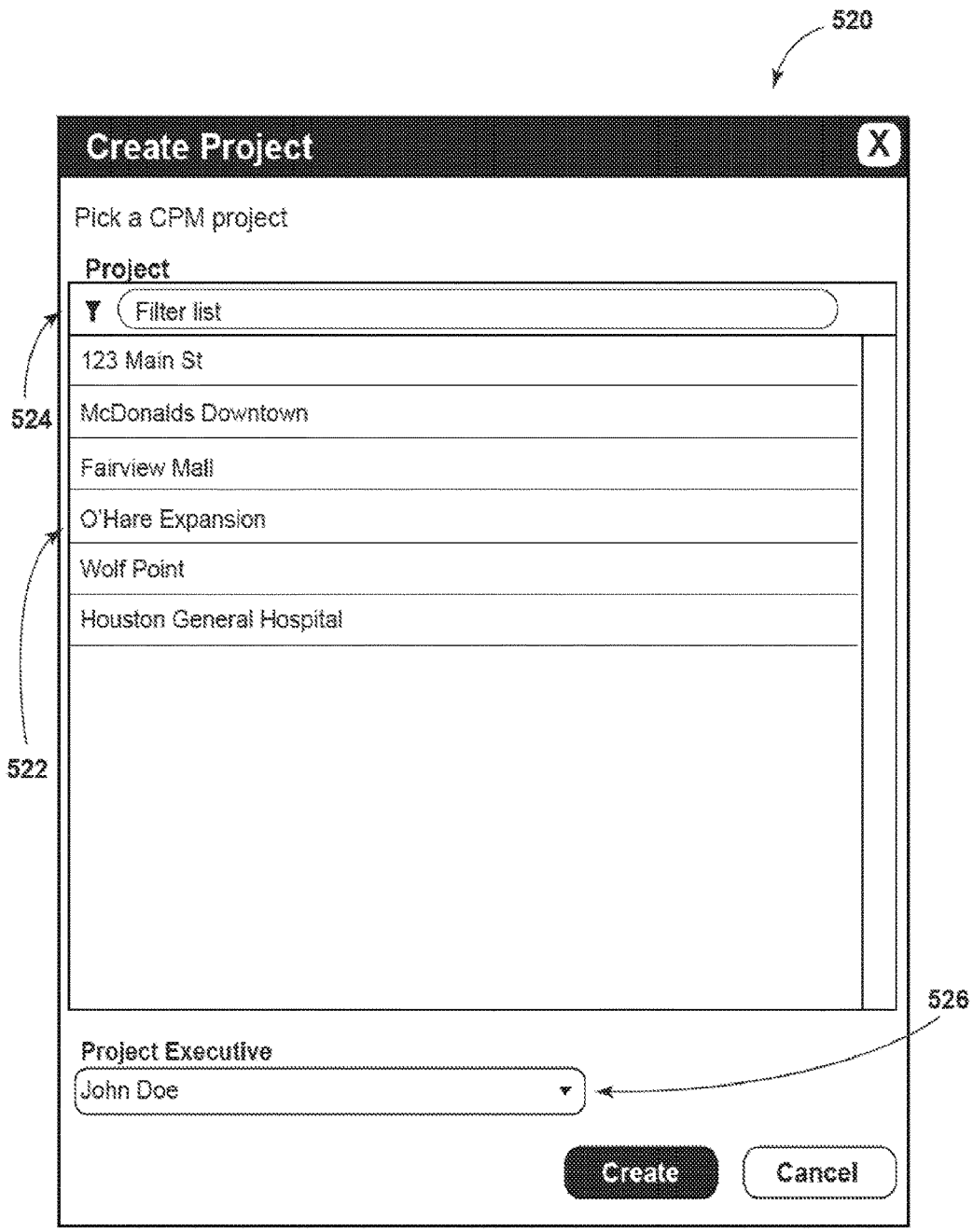

FIGS. 6-7 are screen shots illustrating user interfaces that allow a user to create an evaluation project (at block 503). FIG. 6 illustrates a user interface 510 that lists existing evaluation projects (e.g., project title, number of contracts associated with a project, number of pending evaluations associated with a project, a date and time of last activity, an owner, and a status). To create a new evaluation project, a user can select a "New Project" selection mechanisms 512 included in the interface 510. Upon selecting the "New Project" selection mechanism 510, the system 400 can display an interface 520 as illustrated in FIG. 7. The interface 520 allows a user to select an existing construction project that will serve as the basis for the evaluation project. For example, the interface 520 can include a list of existing construction projects 522 (e.g., based on data stored in a project management system 317). The list 522 can reference existing construction projects by a name or other unique identifier. In some embodiments, a user can filter listed construction projects using a search or filter field 524. In some embodiments, the list of available projects 522 is also limited to existing construction projects that the user is authorized to view and manage. For example, the interface 520 can include an individual selection mechanism 526 (e.g., a drop-down menu) that allows a user to select an individual (e.g., a project executive). Upon selection of an individual using the mechanism 526, the list 522 can be automatically updated to show existing construction projects associated with the selected individual.

In some embodiments, after a user selects an existing construction project, the system 400 accesses data associated with the selected project. The system 400 can use the accessed data to verify that the project is available for an evaluation project (e.g., the construction project isn't already complete) and, in some embodiments, automatically identify evaluation configuration options for the selected construction project. In particular, in some embodiments, particular evaluation configurations may not be applicable for certain types of construction projects. For example, a bid-related evaluation may not be applicable for a construction project that did not include a bidding process. Therefore, the system 400 can use the accessed data for a selected construction project to automatically tailor user interfaces presented to the user (see FIGS. 9-15, described below) based on the type of construction project underlying the evaluation project.

It should also be understood that in some embodiments, an evaluation project can be configured for a particular partner and applied to projects associated with the partner (i.e., defined on a partner-basis as compared to a project-basis). Similarly, in some embodiments, an evaluation process can be configured on a per-phase, per-role, or per-trade basis.

Figure 8:
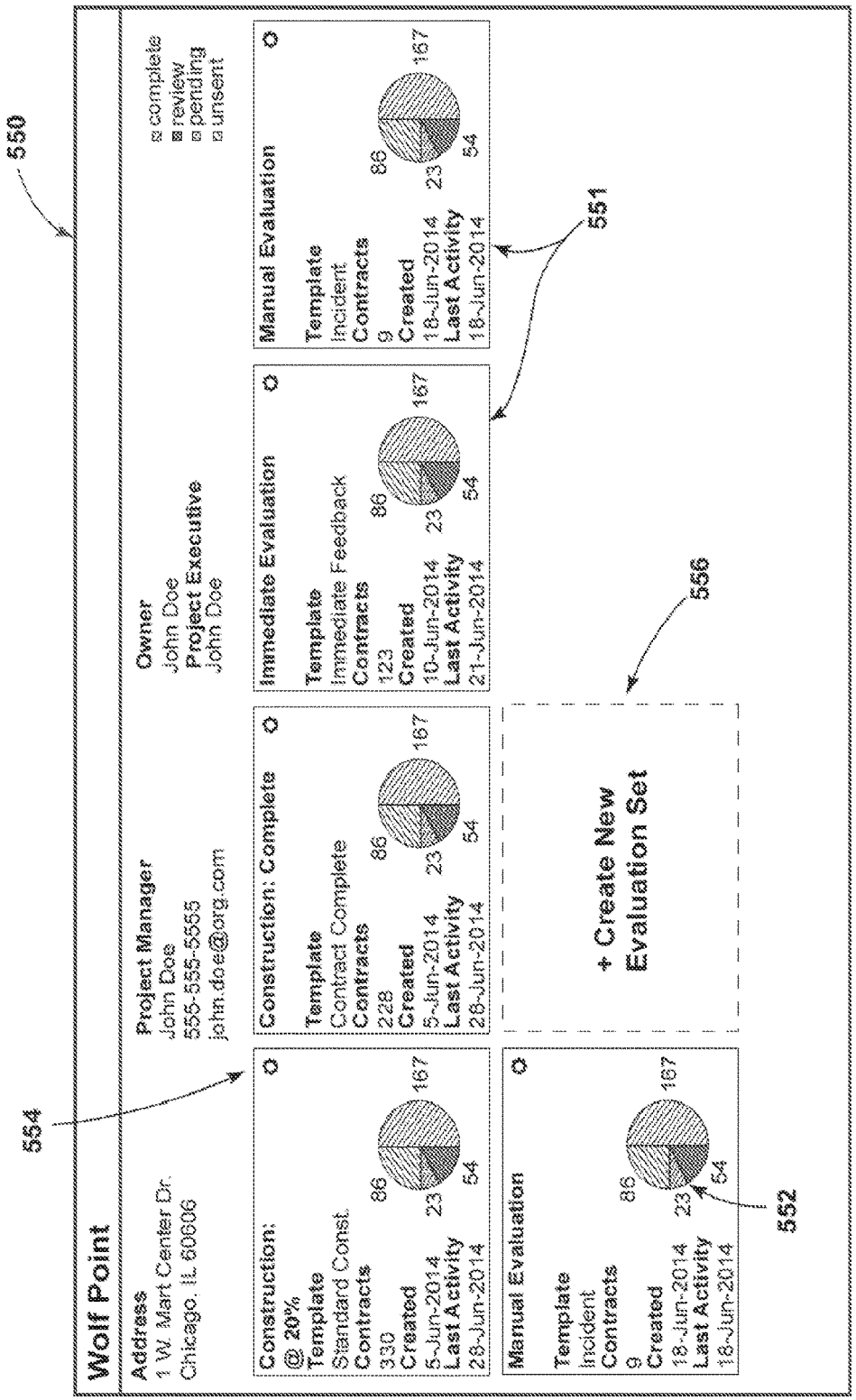
Figure 9:
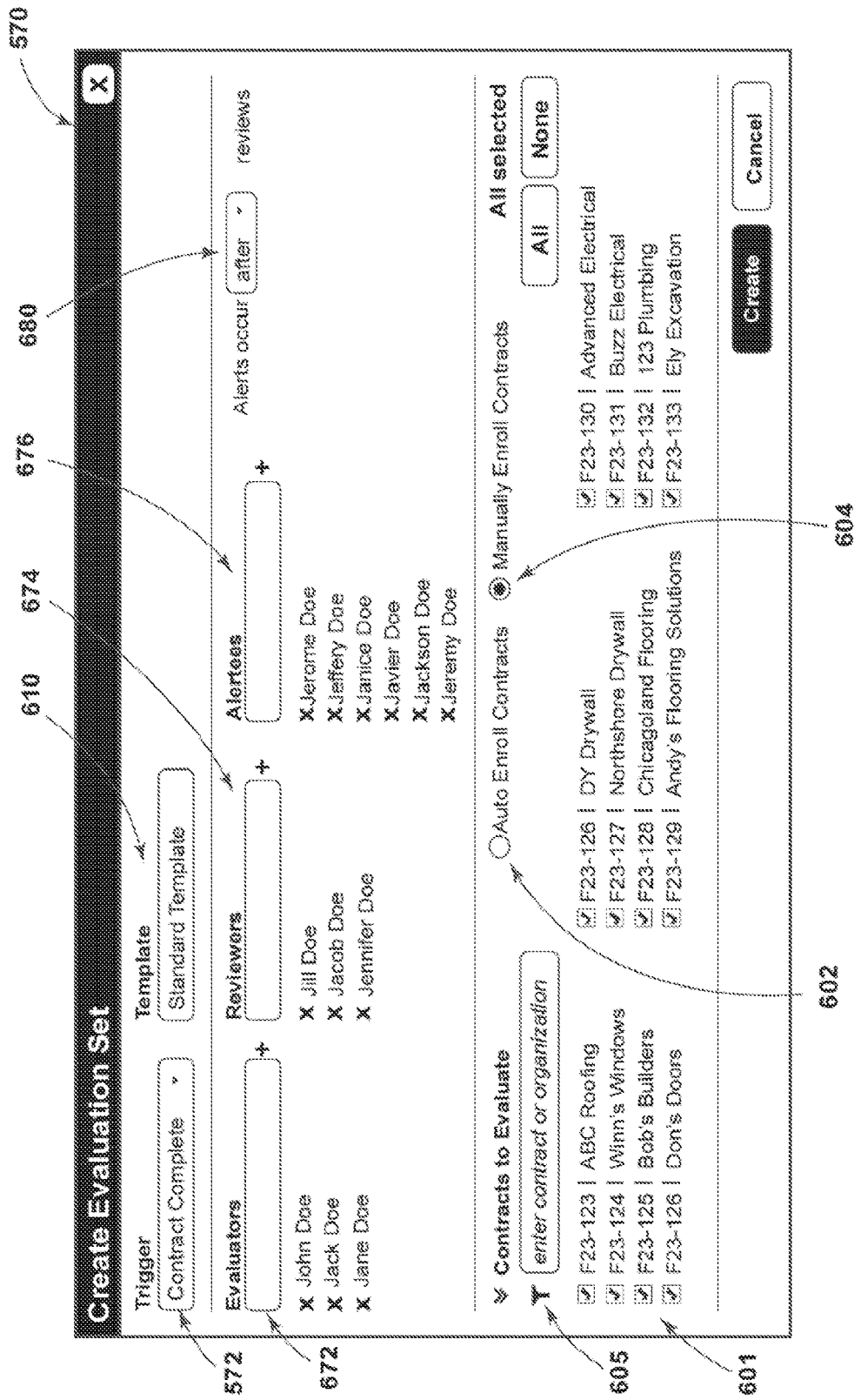
FIG. 9 is a screen shot illustrating a user interface for configuring a triggering event.
Figure 11:
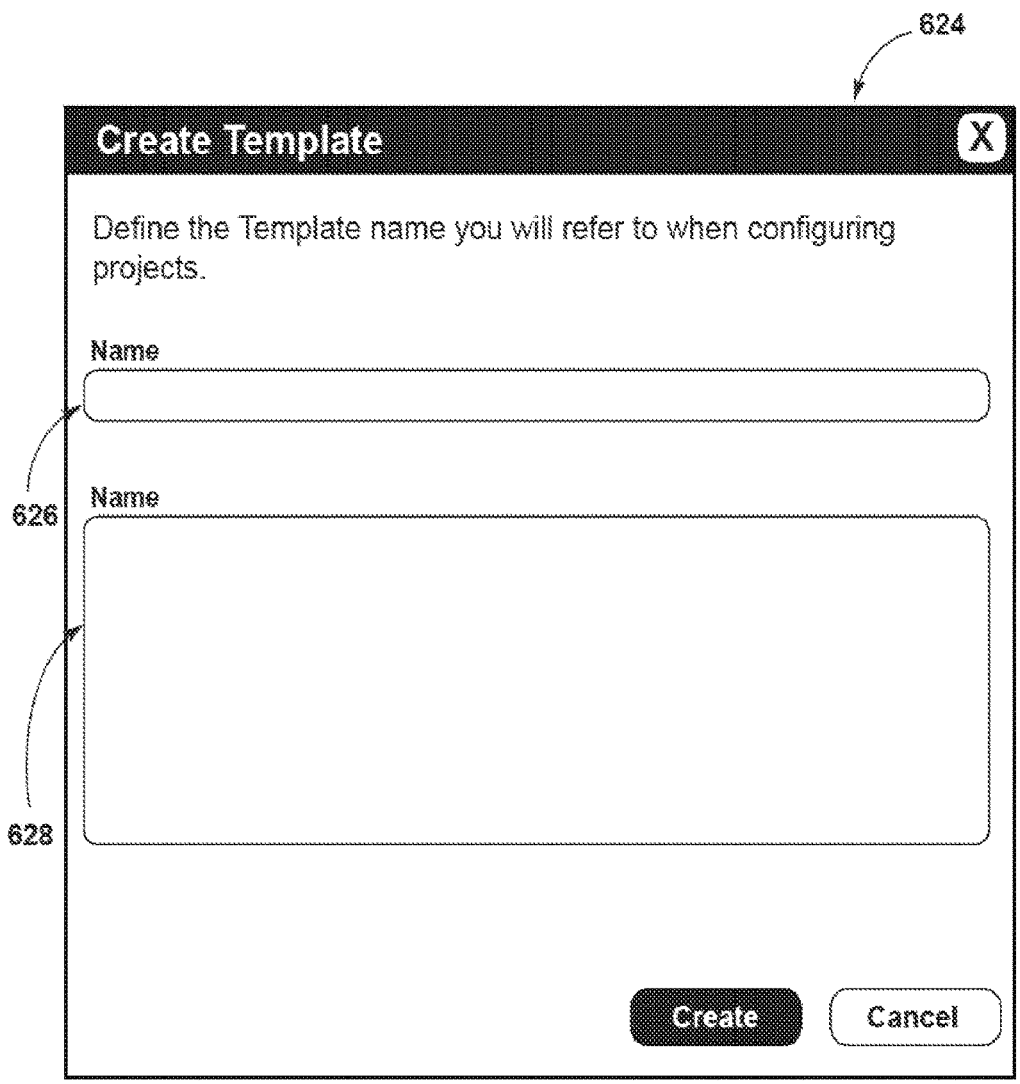

Returning to FIG. 5, after the evaluation project is created (at block 503), a user can specify a triggering event for the evaluation project (at block 530). FIGS. 8-9 illustrate user interfaces for configuring one or more triggering events for an evaluation project. Each triggering event can be an event occurring in a construction project. Events can include, but are not limited to, calendar events (e.g., dates and/or times), construction phases, contract completion markers (e.g., percentages), accounting events, and events relating to the evaluation project itself (e.g., upon the occurrence of a rejected evaluation or an evaluation falling below a predetermined rating).

In some embodiments, the system 400 allows the user to create discrete units that contain triggering events. These discrete units are referred to herein as "evaluation sets." Configuring an evaluation program using these discrete units allows the user greater flexibility and decreases complexity. For example, by providing evaluation sets, the system 400 allows evaluations to address a variety of different situations. For example, a user can create a first evaluation set that generates requests for evaluations after a safety or other incident occurs and a second evaluation set that generates requests for evaluations after a bid is completed.

FIG. 8 is a user interface 550 that indicates a plurality of evaluation sets 551 associated with a particular evaluation project. For each set 551, the interface 550 can specify a different triggering event (e.g., construction completion percentage, contract completion, immediate evaluation, manual evaluation, etc.) and additional rules defining how the triggering event and associated evaluation process is performed. For example, as illustrated in FIG. 8, each evaluation set 551 can be associated with a triggering event, a template used for an evaluation triggered by the event (e.g., standard, immediate feedback, incident, etc.), how many contracts the triggering event applies to, a date of creation, and a date of last activity. As illustrated in FIG. 8, the interface 550 can also display a graphical representation 552 of evaluations associated with each set 551. For example, a pie graph can represent the numbers and/or percentages of evaluations having a particular status (e.g., 167 evaluations completed, 86 evaluations unsent, 23 evaluations pending, and 54 evaluations reviewed). The graphical representations 552 provide a high level view of progress for each evaluation set 551.

To modify an existing evaluation set 551, a user can select (e.g., click on) the set 551 from the interface 550 (e.g., selecting the triggering event or a "settings" selection mechanism 554). To create a new evaluation set, a user can select a "Create New" selection mechanism 556. FIG. 9 illustrates a user interface 570 displayed when a user selects the "Create New" selection mechanism 556. As illustrated in FIG. 9, the interface 570 allows a user to select a triggering event using a "Trigger" selection mechanism 572 (e.g., a drop-down menu of available triggering events). The triggering event can be based on contract completion markers (e.g., every 10% of contract completion, at 20%, 50%, 80%, and 100% completion, etc.), calendar events, defined phases (e.g., after electrical is complete, after a first invoice is processed, etc.), contract creation, invoice status, and bid status. The triggering event can also be based on ad-hoc requests for evaluations. For example, a user can specify configuration settings for evaluations requested manually (e.g., by a user or by another system). These types of evaluations can be used to quickly address issues that may arise that are not associated with an automatic triggering event.

Returning to FIG. 5, depending on the triggering event selected by the user for a particular evaluation set, the system 400 determines where data for determining when the triggering event has occurred is managed. For example, the evaluation system 200 can determine whether the triggering event is based on accounting or financial data (at block 580). If so, the evaluation system 200 can communicate with the payment management system 315 to access construction project data needed to determine when the triggering event has occurred (at block 582). For example, in these situations, the evaluation system 200 can use a project identifier associated with an existing project selected by the user for the evaluation projection (see FIG. 7) or can prompt the user for an identifier of the project recognized by the payment management system 315.

Similarly, if the triggering event is not based on accounting or financial data (at block 580), the evaluation system determines whether the triggering event is based on field issues (at block 590). If so, the evaluation system 200 communicates with the field issue management system 321 to access construction project data needed to determine when the event has occurred (at block 592) For example, in these situations, the evaluation system 200 can use a project identifier associated with an existing project selected by the user for the evaluation process (see FIG. 7) or can prompt the user for an identifier of the project recognized by the field issue management system 321.

As noted above, the evaluation system 200 can communicate with a plurality of other systems to access construction project data. These systems can include the payment management system 315 that manages accounting information, the project management system 317 that manages project status information, the design management system 318, the field issue management system 321 that manages project issues, the prequalification management system 319, and/or the bid management system 323 that manages project bids. Accordingly, the evaluation system 200 can access one or more of these systems to access data needed to determine whether a particular triggering event has occurred. For example, in some embodiments, one or more of these systems manages events associated with a construction project. In particular, events can be pushed by one or more of these systems (e.g., the payment management system 315) to a queue (e.g., maintained on a server) as the events occurs. The evaluation system 200 can then query the queue to identify events matching a user-selected triggering event. It should also be understood that the evaluation system 200 can periodically access this queue to determine when a triggering event has occurred. Alternatively or in addition, the evaluation system 200 can use a trigger service to automatically receive a notification when an event (e.g., any event or an event matching the user-selected triggering event) has occurred. The notification can be provided by the queue (e.g., the server hosting the queue), by the system pushing an event to the queue, or a combination thereof. Also, as noted above, it should be understood that in some embodiments, the functionality performed by the evaluation system 200 as described in the present document can be combined with the functionality provided by one or more of these other systems and, therefore, the evaluation system 200 has direct access to needed information.

As illustrated in FIG. 5, the system 400 also receives configuration setting for the triggering event (at block 600). For example, as illustrated in FIG. 9, the interface 570 can include a list of contracts 601 associated with the underlying construction projects, which a user can use to select identifiers representing those contracts to associate with the triggering event (e.g., enroll with the corresponding evaluation set). The user interface 570 can also include a selection mechanism 602 to automatically enroll all contracts in the evaluation set and a selection mechanism 604 to manually select contracts for enrollment in the evaluation set. When the user selects the manual enrollment selection mechanism 604, the user can individually select contracts from the list 601. In some embodiments, the interface 570 also includes a search mechanism 605 that allows the user to search or filter within the list of contracts 601. Defining the contracts per evaluation set (e.g., per triggering event), allows a user flexibility to create targeted evaluations.

The interface 570 also allows a user to specify a template for the evaluation set using a "Template" selection mechanism 610. The template selected by the user specifies what an evaluation will look like, including what questions are presented in the evaluation and the layout and grouping of the questions. As illustrated in FIG. 8, different templates can be specified for different triggering events. For example, a user can create a first evaluation template to be used when a contract is 10% complete and a second evaluation template to be used when a contract is 100% complete.

In some embodiments, the "Template" selection mechanism 590 includes a drop-down menu of available templates. However, in some embodiments, a user can build a new template or modify an existing template to customize a template for a triggering event (at block 612). For example, FIG. 10 illustrates a user interface 620 that lists available templates. Each available template can be associated with a name, a description (e.g., explaining what situations the template is useful for), a creation date, an owner or creator (e.g., specifying who can modify the template), and a number of projects that the template is used in. To create a new template, a user can select a "New Template" selection mechanism 622. Upon selecting the selection mechanism 622, the system 400 displays an interface 624 to the user (see FIG. 11). The interface 624 includes a "Name" input mechanism 626 and a "Description" input mechanism 628 that allows the user to enter a name and a description for a new template.

Figure 12:
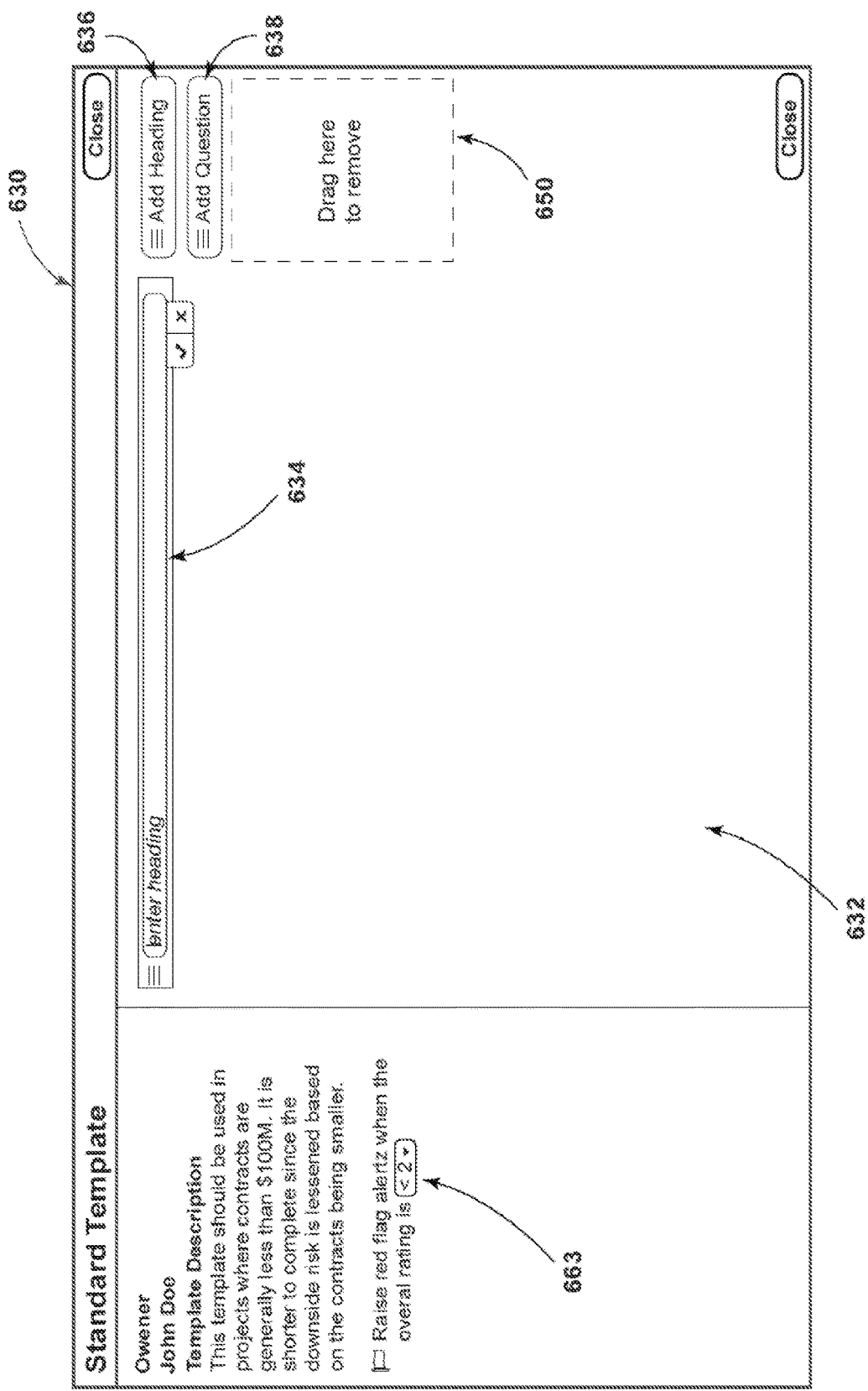

As specifying the name and description for a new template using the interface 624, the system 400 displays an interface 640 to the user that allows the user to build the new template (see FIG. 12). As illustrated in FIG. 12, a user can use the interface 630 to add headings and questions into a layout area 632. As illustrated in FIG. 12, a headings selection mechanism 634 can allow a user to enter the name of a heading to add to the layout area 632. In other embodiments, a user can select an "Add Heading" selection mechanism 636 to view a list of available headings and select headings from the list to add to the layout area 632. Similarly, a user can select the "Add Question" selection mechanism 638 to view a list of questions 640 and select questions from the list 640 to add to the layout area 632 (see FIG. 13). As illustrated in FIG. 13, the list of available questions 640 can be sorted based on question type. For example, a user can select a question type using a "Question Type" selection mechanism 642 to view different types of questions. In some embodiments, the question types can correspond to the available headings. As also illustrated in FIG. 13, to add a particular question to the layout area 632, the user can select a "Select" selection mechanism 644 associated with a desired question.

In some embodiments, predefined headings and/or questions are provided to improve consistency throughout the evaluation process and allow an evaluation to be quickly created. However, in some embodiments, a user can customize headings and questions.

After adding a header and/or a question to the layout area 632, a user can delete a heading or a question from the layout area 632 by dragging the heading or question from the layout area 632 to a removal area 650. However, it should be understood that other mechanisms for deleting a heading or a question could be used (e.g., right-clicking and choosing delete, clicking a delete button associated with a heading or question, etc.). Similarly, in some embodiments, a user can move headings and questions within the layout area 632 (e.g., by dragging) to define an order of headings and/or questions.

As illustrated in FIG. 14, the interface 630 can also allow a user to specify parameters for individual questions. For example, a user can specify whether a question is required or can be skipped (e.g., using a "Required" selection mechanism 660) and whether an alert threshold is associated with the question. For example, a user can set a "Flag" selection mechanism 662a to associate an alert threshold with a question and can set the alert threshold using an alert threshold selection mechanism 662b. As described in more detail below, if an evaluator's answer to a particular question on an evaluation satisfies (e.g., meets or exceeds) the specified alert threshold, the system 400 automatically generates a notification. For example, a user can set an alert threshold for a particular question based on whether a reviewer answers "yes" to a "yes/no" question or provides a rating less than a predetermined number for a rating question. A user can also set an alert threshold based on a reviewer's answer to multiple questions. For example, as illustrated in FIGS. 12 and 14, a user can set an alert threshold based on a final rating for an evaluation (e.g., final overall rating is less than 2) using an overall alert selection mechanism 663. In some embodiments, a user can also configure how notifications associated with alert thresholds are generated and/or sent (e.g., email, text, etc.), who receives a particular notification (one or more users), and what actions can be taken in response to such a notification. Accordingly, the alert framework allows a user to pre-define a set of users to notify when a low evaluation is submitted (e.g., low score, negative feedback, etc.). This capability combined with the ability of a user to manually initiate a review at any time, shortens the feedback cycle and allows users to take actions quickly after receiving negative feedback regarding a particular partner.

After configuring a template (if applicable) (at block 612, FIG. 5), the user can select a template to use with the current evaluation set using the "Template" selection mechanism 590 included in the interface 570 (see FIG. 9) (at block 670). For example, as noted above, the "Template" selection mechanism 590 can include a drop-down menu of available templates, including customized templates.

Returning to FIG. 9, the interface 570 also allows a user to specify what individuals should be provided with an evaluation upon occurrence of the selected triggering event (i.e., select evaluators) through an "Evaluators" input mechanism 672 (at block 673). Optionally, as also illustrated in FIG. 9, a user can specify one or more users who review evaluations submitted by the evaluators (i.e., select reviewers) using a "Reviewers" input mechanism 674 (at block 675). The reviewers are different than the evaluators. This extra level of review can ensure that a particular user is not providing false, incomplete, or otherwise inadequate evaluations. This level of review relating to evaluators also ensures uniformity of evaluation scoring between evaluators across the entire evaluation program. It should be understood that a reviewer can be associated with the same partner as the evaluator (e.g., a supervisor for an employee who completes the evaluation) or a different partner (e.g., a contractor reviewing an evaluation submitted by a subcontractor hired by the contractor). In other embodiments, the user reviewing a completed evaluation can be an administrator, such as the user who initially configured the evaluation process.

The interface 570 also allows a user to specify one or more individuals who are alerted based on completed evaluations (i.e., select alertees) using an "Alertees" input mechanism 676 (at block 677). In some embodiments, the alertees represent those users who are automatically notified when an evaluation (e.g., a particular question or an overall evaluation) exceeds an associated alert threshold as described above. However, if completed evaluations are subject to review, the system 400 can allow a user to specify whether notifications are sent to the alertees before or after evaluations are reviewed.

As illustrated in FIG. 9, more than one evaluator, reviewer, and alertee can be specified for a particular triggering event. In some embodiments, a user can select an individual as an evaluator, reviewer, or alertee from a list of applicable individuals. Alternatively, a user can select individuals for the evaluators, reviewers, and alertees by entering an identifier for an individual (e.g., name, email address, etc.). Defining users for each function per evaluation set allows evaluations to be segmented by user role.

The system 400 stores received evaluation project configuration data (e.g., triggering events, templates, evaluators, reviewers, alertees, contracts, etc.), and, as described in more detail below (see FIG. 16), the system 400 uses the stored data to automatically determine when a triggering event occurs and automatically take one or more actions as specified by the evaluation project configuration data.

Also, a user can query stored evaluation project configuration data to monitor the status of a particular evaluation set 551. For example, a user can use the interface 550 described above with respect to FIG. 8 to monitor the status of individual evaluation sets. Also, in some embodiments, a user can select an individual evaluation set to obtain more information regarding the evaluation set. For example, as illustrated in FIG. 15, upon selecting (e.g., clicking on) a particular evaluation set from the interface 550, the system 400 can display a user interface 700 that provides details of the set and history accruing under the set. In particular, the interface 700 can specify what contracts (and associated partners) are enrolled in the set and how many evaluations have been initiated or sent and how many of those have been completed. In some embodiments, the interface 700 also specifies when a contract was added to the evaluation project and the date of last activity associated with the contract. Furthermore, in some embodiments, the interface 700 can specify an overall rating for each contract (i.e., each partner). The rating can include an average overall rating (e.g., between 1 and 5) based on evaluations completed for the contract.

Also, as illustrated in FIG. 15, the interface 700 can include one or more selections mechanisms that a user (e.g., an evaluation project administrator) can select to take particular actions with regard to a particular contract. For example, a user can select a "Reassign" selection mechanism 702*a* to reassign a contract to a new partner. For example, if a partner receives too low of a rating under a contract, the user may be able to assign a different partner to complete the contract (or enter into a new contract with a different partner). Similarly, a user can select a "Review" selection mechanism 702*b* to manually initiate review of a partner. As noted above, manually-initiated evaluations can be configured through an evaluation set and can be associated with a different template and configurations than event-based evaluations. As also illustrated in FIG. 15, a user can select a "Cancel" selection mechanism 702*c* to cancel a contract's enrollment with the evaluation set (e.g., if a contract is complete, if the contract has been reassigned, if a contract has been canceled, if a partner is consistently receiving ratings and, therefore, no more ratings are needed, etc.).

Figure 16:
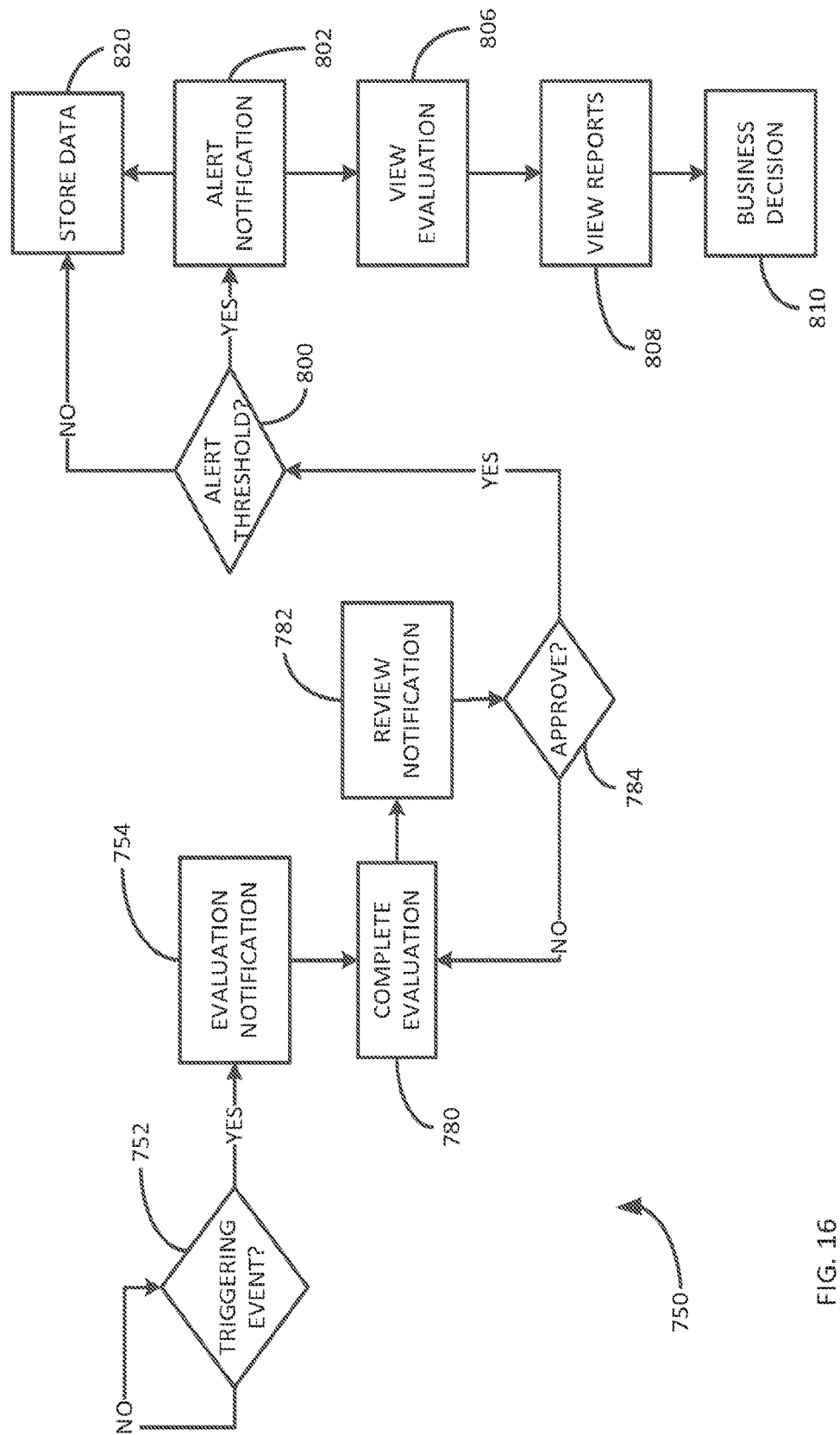
FIG. 16 is a flowchart illustrating a method for processing an evaluation performed using the systems of FIGS. 2-4.

As noted above, after an evaluation set is created, the system 400 stores the associated data and processes the system (along with construction project data) to automatically detect the occurrence of a triggering event and take the appropriate action(s) upon such an occurrence. For example, FIG. 16 illustrates an evaluation process 750 performed by the system 400. As illustrated in FIG. 16 and as described above, the system 400 can process construction data from one or more systems (e.g., a payment management system 315, a project management system 317, etc.) to identify when a triggering event has occurred (at block 752). For example, in some embodiments, as described above, the evaluation system 200 can use a trigger service that processes data managed by these other systems and automatically alerts the evaluation system 200 when a triggering event occurs.

If a triggering event has occurred (at block 752), the system 400 generates a notification (e.g., an email message, text message, etc.) and transmits the notification to the evaluators defined for the triggering event (at block 754). In some embodiments, the notification includes an evaluation (e.g., embedded in the message and/or attached to the message) and/or a link to the evaluation. In other embodiments, the notification may include a message that an evaluation has been added to a user's task list (e.g., within the evaluation system 200 or the project management system 317). For example, as illustrated in FIG. 17, the system 400 can provide a user with a user interface 758 that lists pending tasks. As illustrated in FIG. 17, the user interface 758 can include a status bar 760. The status bar 760 specifies the number of evaluations pending completion by the user, the number of evaluations pending review by the user, and the number of alerts sent to the user. The interface 758 also includes a list 761 of pending tasks for the user (e.g., evaluations to be completed, reviews to be completed, and alerts to be reviewed). For each listed task, the list 761 can provide an indication of the partner associated with the action item evaluation and how long an action item has been pending. Accordingly, the status bar 760 and the list 761 provide a user with relevant information to allow the user to select an appropriate task to complete. In some embodiments, a user can also dismiss a task without taking any actions (e.g., by selecting a close or delete icon 762 associated with a task (see FIG. 19). However, to complete an evaluation, a user can select the task associated with completing the evaluation, which causes the system 400 to display the evaluation 763 in the interface 758. It should be understood that other mechanisms for providing a notification to a user can be used.

Upon receiving notification of an evaluation, the user completes the evaluation (at block 780, FIG. 16). After a user completes an evaluation, the evaluation can be reviewed (e.g., if reviewers were specified as part of the evaluation set for the occurring triggering event). In particular, after a user completes an evaluation or after an evaluation is requested, the system 400 transmits a notification (e.g., an email message, text message, etc.) to each specified reviewer. The notification alerts the reviewer of the evaluation requiring review (at block 782). A reviewer can then approve or reject an evaluation or part of an evaluation (at block 784).

Figure 18:
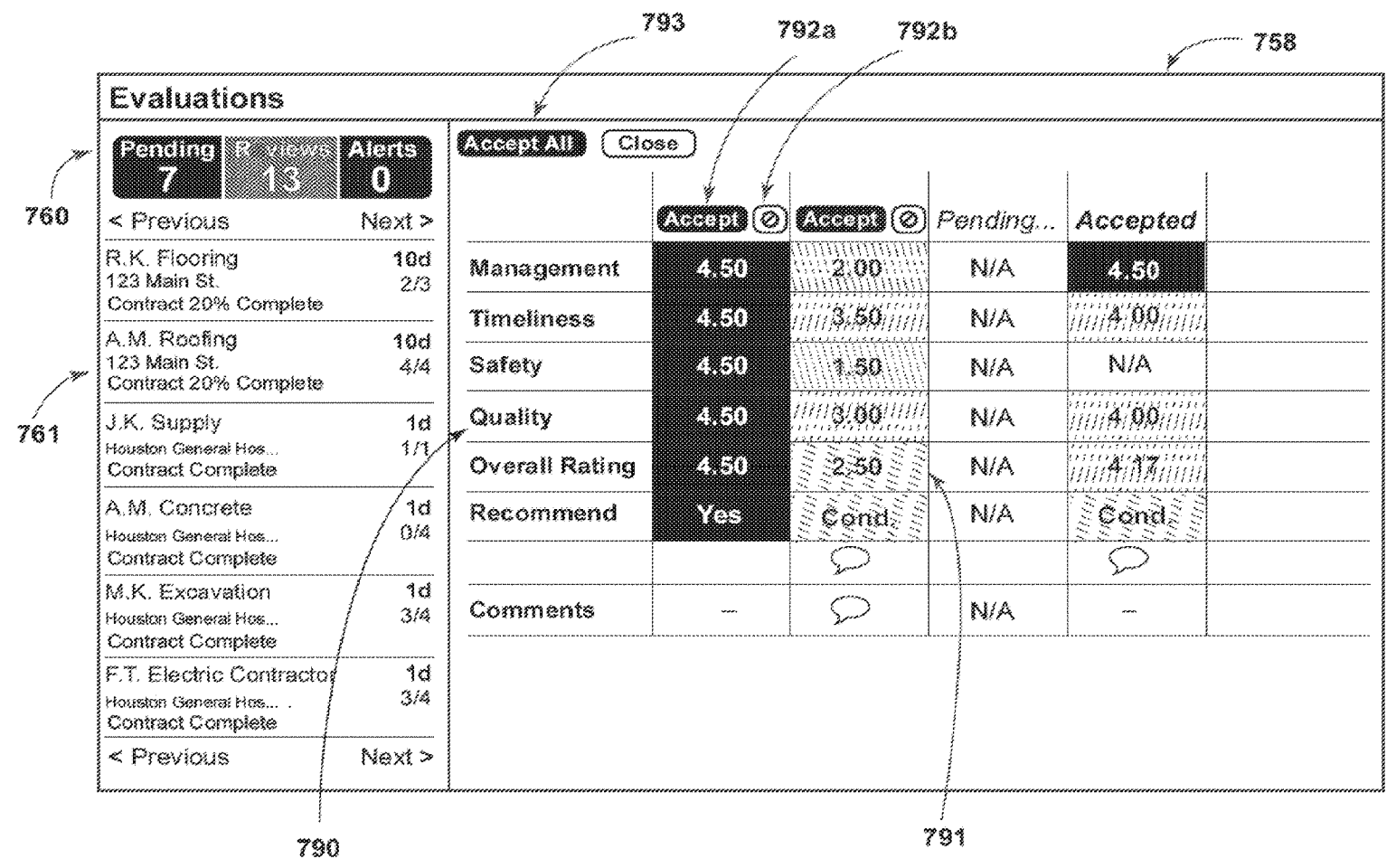

For example, FIG. 18 illustrates the user interface 758 displaying a list 790 of one or more evaluations requiring review by a reviewer. In some embodiments, each listed evaluation provides one or more ratings (e.g., individual heading ratings and an overall rating) provided by a particular evaluator and other feedback from the evaluator (e.g., comments, recommendations, etc.) (e.g., in summary form). In some embodiments, the individual ratings and feedback 791 can be color-coded to provide the user with quick differentiates between "low" ratings that may need to be re-assessed by the evaluator and "normal" ratings. For example, the color-coding can generalize ratings into groups, so that a user can quickly identify low ratings, high ratings, and outlier ratings.

A user can use an "Accept" selection mechanism 792*a* or a "Reject" selection mechanism 792*b* to accept or reject, respectively, the evaluation submitted by a particular evaluator. In some embodiments, each provided rating, recommendation, and/or comment can be associated with "Accept" and "Reject" selection mechanisms 792*a*, 972*b* to allow a reviewer to accept or reject portions of an evaluation. Also, in some embodiments, the interface 758 includes an "Accept All" selection mechanism 793 that allows a user to accept all evaluations needing review.

In addition, as illustrated in FIG. 18, past evaluations reviewed by the reviewer can be displayed in the list 790 along with an "accepted" or "rejected" status. In some embodiments, a reviewer can also modify an evaluation. If a reviewer modifies an evaluation, in some embodiments, the system 400 can create and store an audit log that identifies the modifications. Also, in some embodiments, a reviewer is presented with a full copy of the completed evaluation for review (e.g., overall review and/or individual question review) as compared to a summary of an evaluation as illustrated in FIG. 18.

If a reviewer rejects an evaluation (or a portion thereof) (at block 784, FIG. 16), the evaluation can be returned to the evaluator who completed the evaluation for updating and resubmission (at block 780). If an evaluator makes modifications to the previously-submitted evaluation, the system 400 can create and store an audit that identifies the modifications. As an alternative to requesting modification by the original evaluator (or if an evaluator fails to update a rejected evaluation), the system 400 can mark the rejected evaluation as "rejected," which can cause the evaluation to be excluded from later processing (e.g., aggregated data as described below).

Figure 19:
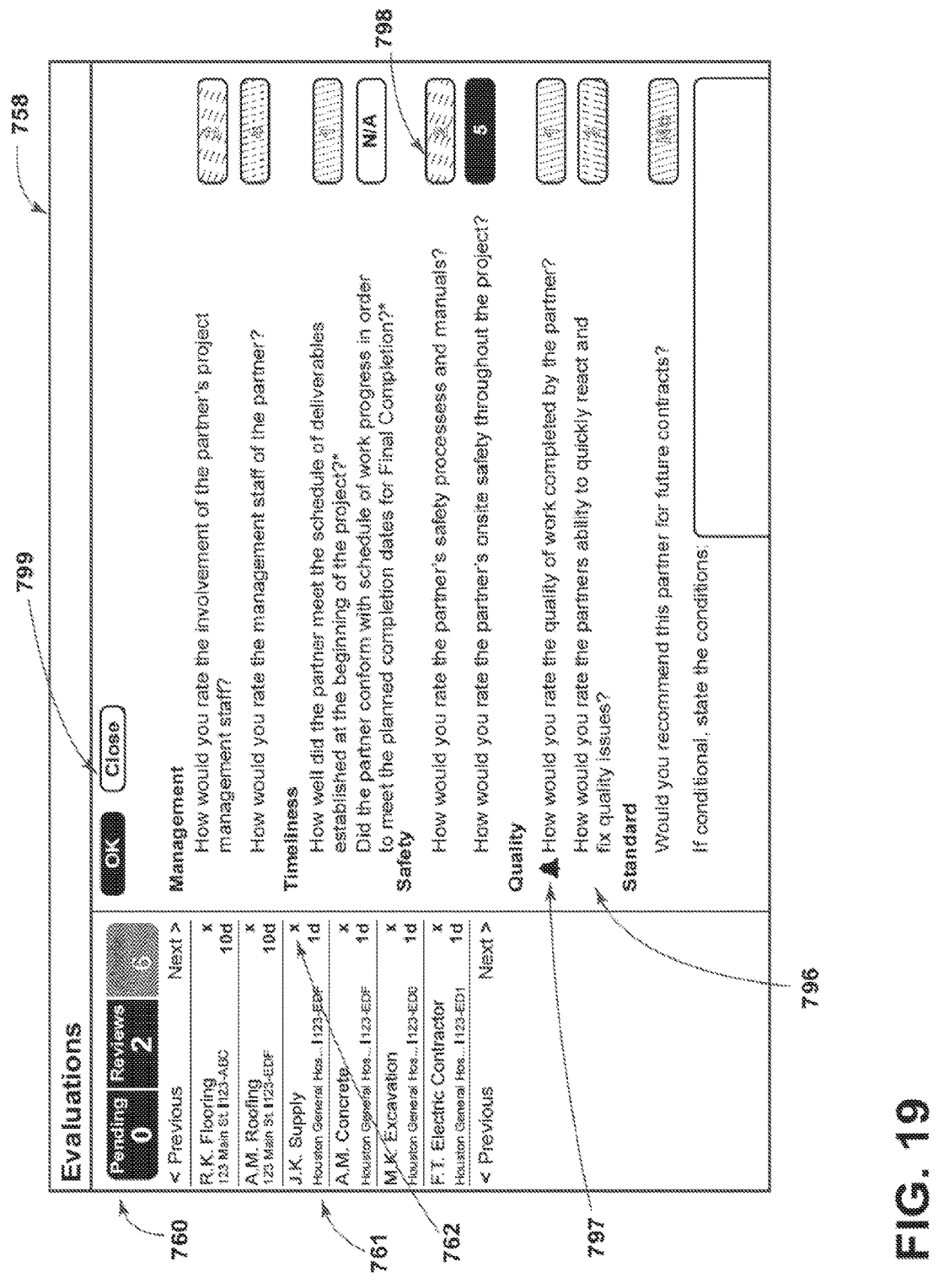

If an evaluation is approved (at block 784), the system 400 determines whether any notifications need to be generated for the evaluation (at block 800). For example, completed evaluations can be automatically processed by the system 400 to determine whether any alerts should be generated. As described above, an alert can be based on whether particular answers or ratings provided in an evaluation satisfy a user-configured alert threshold. If an alert should be generated, the system 400 generates a notification (e.g., an email message, text message, etc.) that informs one or more users (e.g., the alertees configured for the evaluation set) of the alert (at block 802). In some embodiments, the notification includes the completed evaluation or a portion thereof. In other embodiments, the notification alerts the user of the existence of the completed evaluation and, optionally, why the alert was generated. The notification can also include one or more links that allow the user to view the evaluation or evaluation data (e.g., in aggregate) and/or take other actions in response to the alert (e.g., initiate another evaluation, etc.). For example, as in FIG. 19, the user interface 758 can display a portion of an evaluation 796 associated with an alert and highlights or otherwise marks (e.g., see the alert or bell icon 797) the one or more answers causing the alert. As also illustrated in FIG. 19, answers 798 provided in the evaluation 796 can be color-coded to allow the alertee to quickly assess answers and associated ratings. A user can a select an "Ok" selection mechanism 799 that clears the alert (e.g., if no action is required or to indicate that the user has taken the appropriate action). It should be understood that, in some embodiments, the system 400 processes a completed evaluation for alerts before or after the evaluation is reviewed.

As illustrated in FIG. 16, a user receiving an alert can review the specific evaluation causing the alert (at block 806) and other reports (e.g., overall ratings and other statistics for the partner associated with the evaluation causing the alert) (at block 808). Accordingly, the user can use this information to make a business decision (at block 810). For example, as noted above, a user can reassign and or initiate review of a partner receiving poor evaluations (see FIG. 15).

Figure 21:
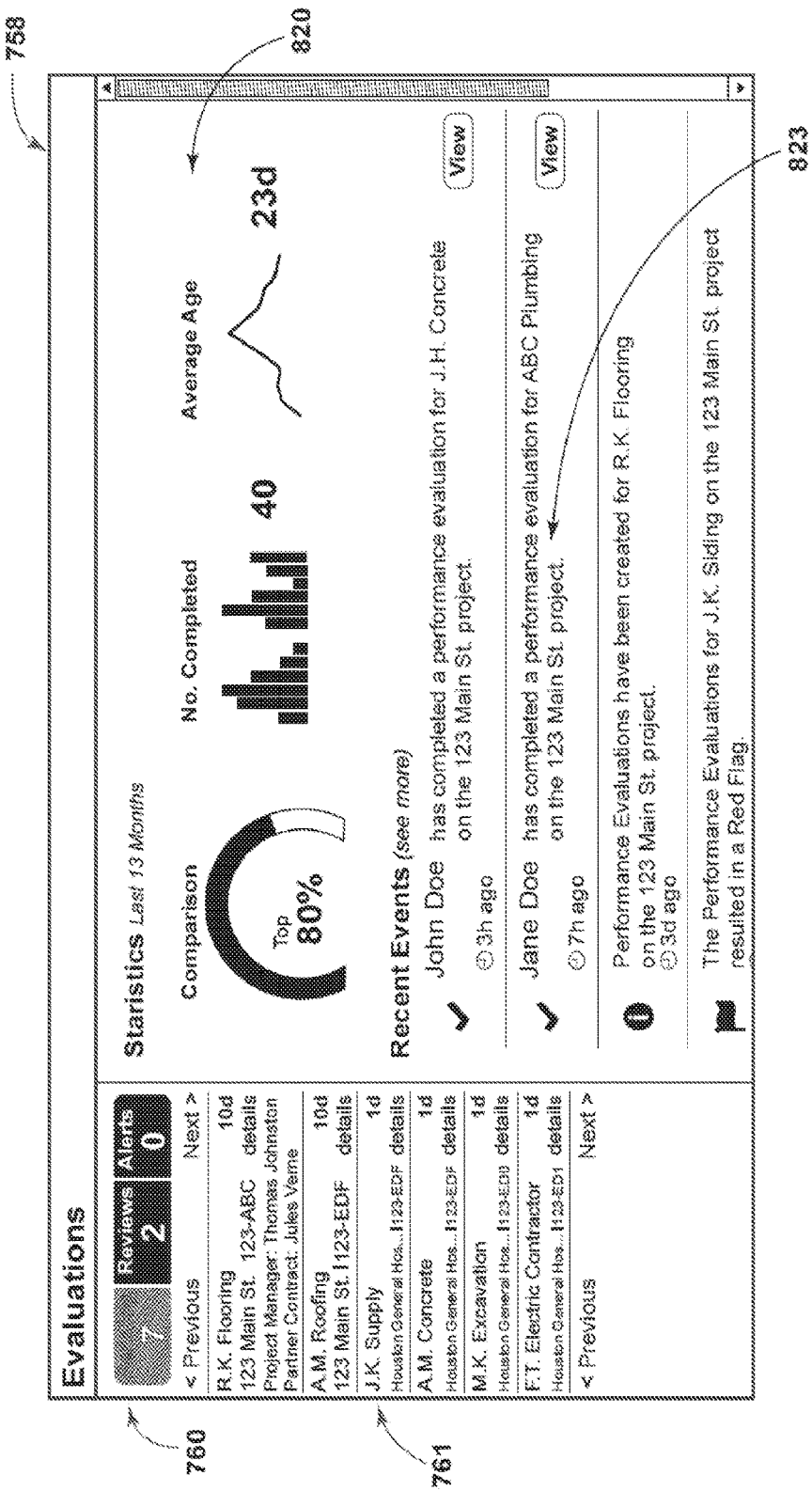
FIG. 21 is a screen shot illustrating statistics and events associated with evaluations.

Regardless of whether an alert is generated for a particular evaluation, the system 400 collects completed evaluations and makes evaluation data (e.g., individual completed evaluations and aggregated evaluations) available to partners (at block 820). For example, as evaluations are created, the system 400 stores each evaluation as a unique historical item. A user can then search for evaluations associated with a particular project, partner, evaluator, status, rating, alert status, triggering event, etc. For example, FIG. 20 illustrates a user interface 810 provided by the system 400 that allows a user to search for and/or filter evaluations. Furthermore, as illustrated in FIG. 21, the user interface 758 can include a statistics summary portion 820. The portion 820 can provide one or more graphical representations 822 that provide a summary of evaluations over a predetermined period (e.g., the past 12 months). For example, the graphical representations 822 can specify a percentage of evaluations completed, a number of evaluations completed, and an average age of an evaluation. The summary portion 820 can also include a list 823 of recent event that allow a user to keep track of evaluation-related events (e.g., evaluations submitted, evaluations reviewed, alerts generated, etc.). Accordingly, the portion 820 provides real-time feedback upon completion of an evaluation.

As noted above, the evaluation system also aggregates evaluation data. The aggregated data can include, but is not limited to, a number of pending evaluations, a number of pending alerts, statistics for particular partners, status of particular projects and/or evaluations, recent events, partner ratings and/or rankings, etc. As noted above, in some embodiments, different aggregations are provided to different users based on their assigned role. Also, in some embodiments, the aggregated can also include one more selection mechanisms that allow a user to take one more actions (e.g., manually initiate an evaluation, reassign a contract, etc.).

Figure 22:
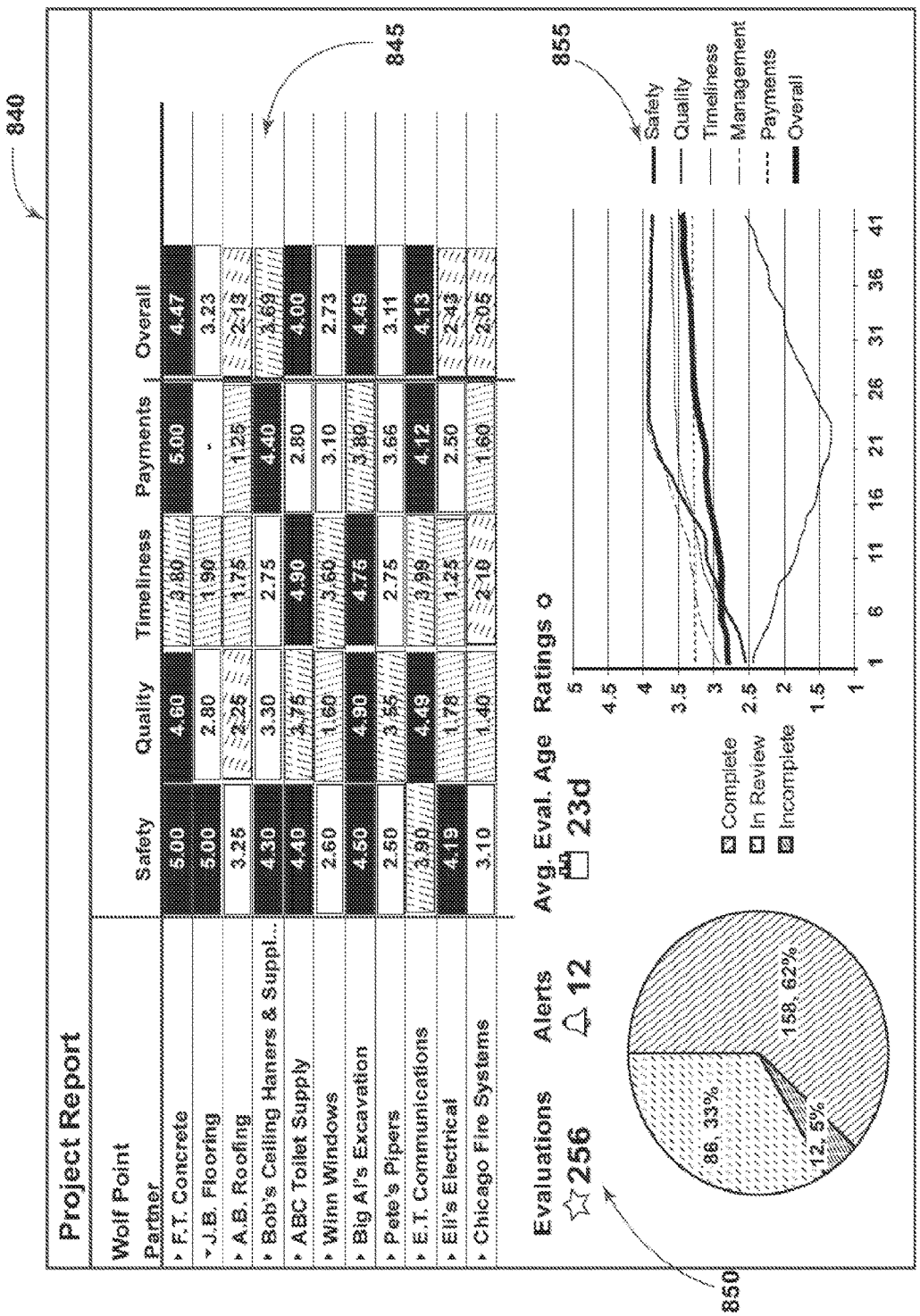
FIG. 22 is a screen shot illustrating an individual project report.

For example, as illustrated in FIG. 22, the aggregated data can include an individual project report 840 that lists partner ratings 845 for partners included in a particular evaluation project (e.g., a particular construction project). The ratings 845 can be defined (e.g., averaged) based on evaluations received for a particular partner included in a project. As illustrated in FIG. 22, the ratings 845 can be color-coded to aid the user in identifying partners associated with high, average, or low ratings for a particular project.

The project report 840 can includes overall project statistics 850 that (graphically or textually) provide evaluation numbers, alert numbers, average ages of evaluations, etc. Also, the project report 840 can include a trend analysis 855 that indicates how ratings trend over the life of the project (or a subset thereof). In particular, the trend analysis 855 can illustrate the direction of performance for the project.

As illustrated in FIG. 22, the partner ratings 845 and the trend analysis 855 can categorize evaluation data (e.g., safety, quality, timeliness, payments, personnel, and overall). In some embodiments, these categorizes can correspond to headings on evaluations. Accordingly, by using consistent headings in templates for a particular project, partners can be compared with other partners for the same categories across projects (e.g., while still allowing customized questions). Categorizing the data allows the system 400 to summarize the specific answers to specific questions into categories like safety, quality, timeliness, management, etc., which allows users to compare partners on a more equal footing while also focusing on aspects of a partner that a user is most interested in. Accordingly, including this categorized data in dashboards and reports provides business insights that pertain to broad data categories instead of any particular questions. However, in some embodiments, a user can expand a rating for a particular partner included in the ratings 845 to view details relating to the overall rating.

In some embodiments, the system 400 can also create a partner report 860 as illustrated in FIG. 23. The report 860 includes partner ratings 865 that represent overall ratings for partners across projects. As described above with respect to the partner ratings 845 for an individual project, the ratings 865 can be categorized and color-coded to aid review. A user can also select a particular partner included in the ratings 865 to drill-down into specific ratings for each project that the partner is involved in.

Figure 24:
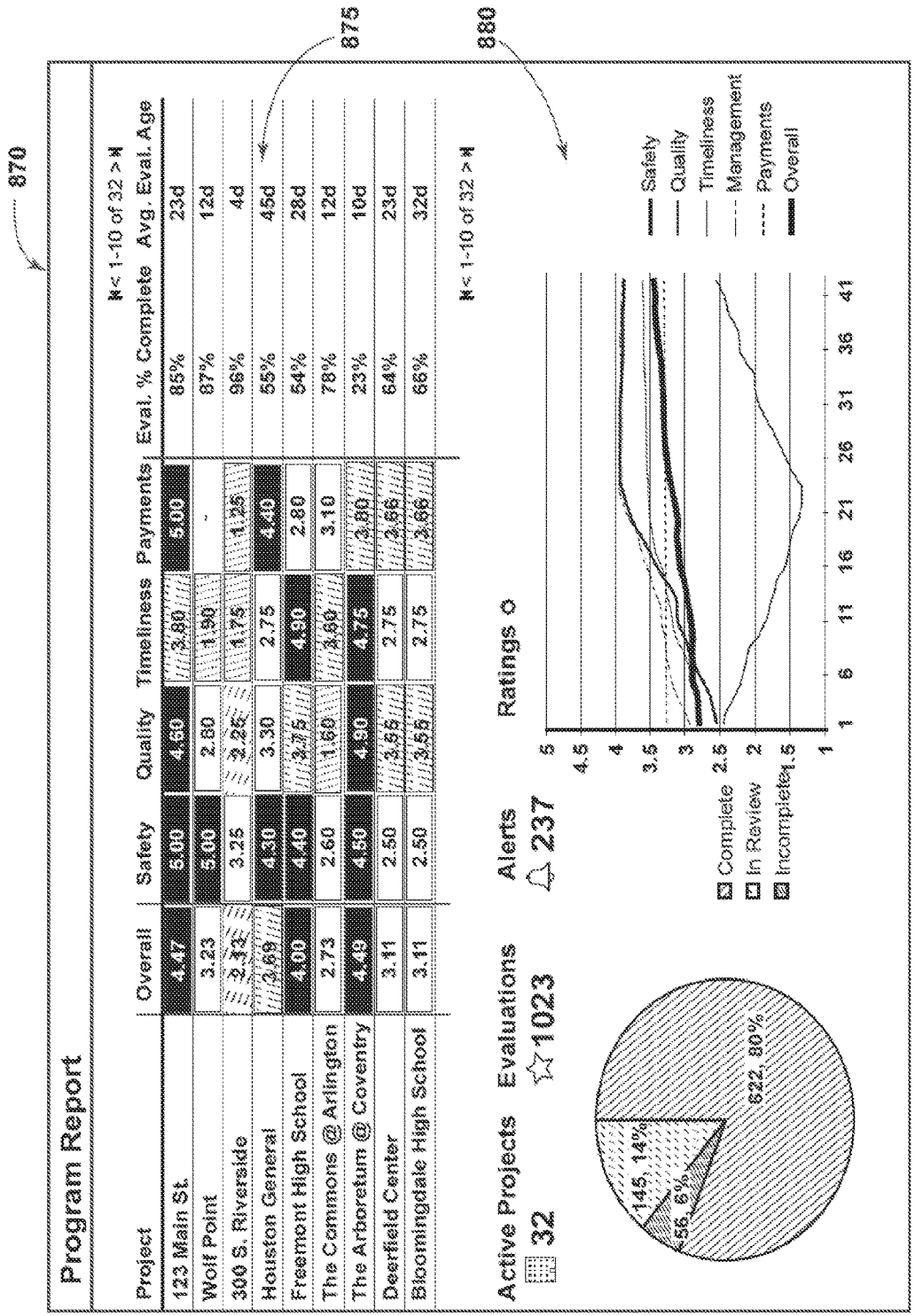
FIG. 24 is a screen shot illustrating an aggregated project report.

The system 400 can also generate an aggregated project report 870 as illustrated in FIG. 24. The project aggregated report 870 can include evaluation data relating to all projects associated with a partner (e.g., a project executive) and can provide overall ratings 875 for each project associated with the partner. Accordingly, the ratings 875 can provide ratings for a particular partner across a plurality of projects. Similarly, the report 870 can provide a trend analysis 880 across the projects for a partner. In addition, the report 885 can include overall project statistics 885 for all of the projects associated with the partner. Accordingly, a user can view the aggregated project report to view the direction of a partner's performance across numerous projects.

The system 400 can also provide reports relating to the evaluation process. For example, as illustrated in FIG. 25, the system 400 can generate an evaluator report 900. The evaluator report 900 provides statistics regarding evaluators. The statistics can include a completeness level (e.g., what percentage of assigned evaluations has the evaluator completed or how much of an evaluation is completed by the evaluator), an average time it takes the evaluator to complete the evaluation, an average age of an evaluation (i.e., how long the evaluation sits until the evaluator completes the evaluation), an average rating given by the evaluator, and a number of completed evaluations. In some embodiments, statistics can be color-coded to allow a user to quickly identify under-performing evaluators. Accordingly, the evaluator report 900 allows a user to track how well particular evaluators complete assigned evaluations. If a particular evaluator is not completing evaluations efficiently or effectively, a user (e.g., a project administrator) can reconfigure the evaluation process to send evaluations to other evaluators to ensure proper feedback is received.

It should be understood that the system 400 can be configured to aggregate collected evaluations in other ways than described above. For example, information regarding particular partners can be used to group partners who perform similar functionality within a construction project (e.g., flooring providers, electricians, etc.). Similarly, data regarding project status or phase can be used with evaluation data to allow users to compare evaluation data for partners at similar phases within a construction project. Furthermore, other parameters such as geographic location, contract price, project scope, project term, etc. can be used by the system 400 (e.g., based on default or manual selections) to group and categorize evaluation data into useful comparisons.

Furthermore, in some embodiments, evaluation data collected through the system 400 can be applied to other aspects of a construction project. For example, the evaluation system 200 can provide evaluations (e.g., ratings, recommendations, alert, etc.) to other systems, including, for example, the payment management system 315, the project management system 317, the field issue management system 321, the bid management system 323, and the design management system 318, and used by the other systems to manage a construction project. For example, the evaluation data can be used to manage new or existing construction projects (e.g., recommend partners based on ratings), manage construction project payments (e.g., withhold payments due to poor evaluations or pending evaluations), and manage construction project bids (e.g., create bids or boost a bid submitted by a partner associated with high ratings or vice versa).

Thus, embodiments of the invention provide systems and methods for triggering evaluations during a construction project, tracking the completion of evaluations, collecting and aggregating completed evaluations, and using the aggregated evaluations to provide statistics and comparisons for entities involved in constructions projects. The evaluation process improves construction project management. For example, many parties in the construction industry operate contracts in a non-collaborative manner, which leads to situations where one entity looks out for its self-interest to the detriment of other entities. However, the methods and systems described above collect and distribute evaluations and associated aggregated reports to provide real-time feedback to an entity and the entity's partners on a frequent and consistent basis. For example, the systems and methods described herein can be used to provide partner performance data to a large central monitor (e.g., to spur competitiveness within the set of partners on a project by making it transparent how all the partners are performing), provide project based reporting (e.g., a set of reports that can provide project specific trended partner data using the aggregated data from all partners on a single project to provide feedback as to whether the project may be experience issues), and provide project based evaluations (e.g., by re-using partner evaluations workflows and framework, the evaluation server can allow users to evaluate a project and the people on a project, which can be reported back to project teams and centralized management).

Similarly, as noted above, the methods and systems described herein can provide 360° performance evaluations. For example, the methods and systems described above can be configured to allow evaluations in either direction of a project hierarchy. In particular, some embodiments, the system 400 allows subcontractors to review GCs, allowing sub-tiers or material suppliers to review subcontractors, etc. Also, as noted above, the methods and systems can be configured to allow evaluations of evaluators (e.g., to ensure that a partner is providing timely, accurate, and useful information in evaluations). Furthermore, it should be understood that the evaluation process can be applied at one or more levels of a construction project. For example, a general contractor can configure an evaluation process for those partners hired by the general contractor and a contractor can configure an evaluation process for subcontractors hired by the contractor. Furthermore, it should be understood that different users can be associated with different permissions associated with the evaluation methods and systems described herein. These permissions can specify whether a user is allowed to configure an evaluation project or portions thereof. For example, in some embodiments, some users associated with a particular entity (e.g., a general contractor) can have permissions that allow those users to configure triggering events, while other users have permissions that only allow those other users to configure evaluation templates.

Various features and advantages of the invention are set forth in the following claims.

What is claimed is:

1. A system for evaluating entities involved in a construction project, the system comprising:
 a server having access to a plurality of events associated with a construction project, the plurality of events created based on project data provided by a plurality of entities associated with the construction project during a duration of the construction project, wherein the plurality of events includes completion events of the construction project and accounting events of the construction project,
 the server being configured to communicate with a computing device over a network connection and including a processing unit configured to
 receive, from the computing device, configuration information selected by a first entity of the plurality of entities for a first event set and a second event set, wherein the configuration information includes
 (i) an evaluation including multiple questions customized by the first entity of the plurality of entities at least in part by either dragging a question from a layout area in a GUI into a removal area in the GUI to remove it from the evaluation, wherein the GUI is updated to show the removal of the question in response to the dragging the question into the removal area, or dragging a question from a first position in the layout area to the layout area to define a new order of questions, wherein the GUI is updated to show the new order of questions in response to the dragging to the second position,
 (ii) a triggering event selected by the first entity of the plurality of entities by clicking on a selection mechanism that includes a list of available triggering events, the list of available triggering events including a calendar date, a phase in the construction project, a completion percentage of the construction project, and an occurrence of a field issue,
 (iii) a set of one or more evaluators associated with the triggering event selected by the first entity by clicking on a selection mechanism that includes a list of available evaluators, where the selected set of evaluators for the first event set differs from the selected set of evaluators for the second event set, and
 (iv) an alert threshold associated with a question of the evaluation and an alertee set using a flag selection mechanism;
 automatically identify when the plurality of events includes the triggering event of the first event set,
 in response to the triggering event of the first event set being included in the plurality of events,
 (i) automatically prompt the evaluators for the first event set, and not the evaluators for the second event set, to complete the evaluation for a second entity of the plurality of entities,
 (ii) present each evaluator for the first event set with a user interface for completing the evaluation that includes a status bar specifying at least one of a count of evaluations pending completion by the evaluator, a count of evaluations pending review by the evaluator, and a count of alerts sent to the evaluator,
 (iii) receive a completed evaluation completed by the evaluators for the first event set at least in part by clicking on a selection mechanism associated with completing the evaluation, and (iv) automatically determine that the completed evaluation satisfies the alert threshold, and when the completed evaluation satisfies the alert threshold, automatically notify the alertee and cause a portion of the evaluation associated with the alert to be displayed with marks indicating an answer causing the alert; and make an aggregation of the completed evaluation available to the first entity, the second entity, and a third entity of the plurality of entities.

2. The system of claim 1, wherein the processing unit is further configured to receive a second triggering event selected by the first entity, wherein the second triggering event includes a manual request for an evaluation, a completion percentage of the construction project, a calendar event, a phase in the construction project, or a field issue.

3. The system of claim 1, wherein the processing unit is further configured to receive a plurality of contracts selected by the first entity and associated with the selected triggering event, wherein the processing unit is configured to automatically prompt the user to complete the evaluation by automatically prompting the user to complete the evaluation when the plurality of events includes the selected triggering event associated with one of the plurality of contracts.

4. The system of claim 1, wherein the processing unit is further configured to receive a plurality of evaluators selected by the first entity and associated with the selected triggering event, wherein the processing unit is configured to prompt the user to complete the evaluation by prompting each of the plurality of evaluators to complete the evaluation.

5. The system of claim 1, wherein the notification to the alertee states why the alert was generated and includes a link that allows the alertee to view the evaluation.

6. The system of claim 1, wherein the processing unit is further configured to receive a template selected by the first entity and associated with the selected triggering event and wherein the processing unit is configured to automatically prompt the user to complete the evaluation by displaying an evaluation form based on the template to the user.

7. The system of claim 1, wherein the processing unit is further configured to display a user interface that provides a graphical representation of a number of evaluations initiated for the selected triggering event and a status of the evaluations initiated for the selected triggering event.

8. The system of claim 1, wherein the processing unit is further configured to display a report including an overall rating for each of a second plurality of entities included in the first plurality of entities based on a plurality of completed evaluations received by the processing unit including the completed evaluation.

9. The system of claim 1, wherein the processing unit is further configured to receive a plurality of completed evaluations including the completed evaluation and aggregate data included in the plurality of completed evaluations to create a report graphically specifying a number of the plurality of completed evaluations, a number of alerts associated with the plurality of completed evaluations, and an average age of the plurality of completed evaluations.

10. The system of claim 1, wherein the processing unit is further configured to track an age of the evaluation representing the time between automatically prompting the user to complete the evaluation and receiving the completed evaluation and display the age in a user interface.

11. A computer-implemented method for evaluating entities involved in a construction project performed by a computing device, the method comprising:

accessing, by a processor of the computing device, a plurality of events associated with a construction project, the plurality of events including project data provided by a plurality of entities associated with the construction project during a duration of the construction project, wherein the plurality of events includes completion events of the construction project and accounting events of the construction project, receiving, by at least the processor from a remote device, configuration information selected by a first entity of the plurality of entities for a first event set and a second event set, wherein the configuration information includes (i) an evaluation including multiple questions customized by the first entity of the plurality of entities at least in part by either dragging a question from a layout area in a GUI into a removal area in the GUI to remove it from the evaluation, wherein the GUI is updated to show the removal of the question in response to the dragging the question into the removal area, or dragging a question from a first position in the layout area to a second position in the layout area to define a new order of questions, wherein the GUI is updated to show the new order of questions in response to the dragging to the second position, (ii) a triggering event selected by the first entity of the plurality of entities by clicking on a selection mechanism that includes a list of available triggering events, the list of available triggering events including a calendar date, a phase in the construction project, a completion percentage of the construction project, and an occurrence of a field issue, (iii) a set of one or more evaluators associated with the triggering event selected by the first entity by clicking on a selection mechanism that includes a list of available evaluators, where the selected set of evaluators for the first event set differs from the selected set of advisors for the second event set, and (iv) an alert threshold associated with a question of the evaluation and an alertee set using a flag selection mechanism;

identifying, by at least the processor, when the plurality of events includes the triggering event of the first event set, in response to the triggering event of the first event set being included in the plurality of events, (i) generating, by at least the processor, a prompt on a display for prompting the evaluators for the first event set, and not the evaluators for the second event set to complete the evaluation for a second entity of the plurality of entities, (ii) presenting each evaluator for the first event set with a user interface for completing the evaluation that includes a status bar specifying at least one of a count of evaluations pending completion by the evaluator, a count of evaluations pending review by the evaluator, and a count of alerts sent to the evaluator, (iii) receiving a completed evaluation completed by the evaluators for the first event set at least in part by clicking on a selection mechanism associated with completing the evaluation, and (iv) automatically determining that the completed evaluation satisfies the alert threshold, and when the completed evaluation satisfies the alert threshold, automatically notify the alertee and cause a portion of the evaluation associated with the alert to be displayed with marks indicating an answer causing the alert; and generating, by at least the processor, an aggregation of the completed evaluation and transmitting the aggregation to the first entity, the second entity, and a third entity of the plurality of entities.

12. The method of claim 11, wherein the method further comprises receiving a second triggering event selected by the first entity, wherein the second triggering event includes a manual request for an evaluation, a completion percentage of the construction project, a calendar event, a phase in the construction project, or a field issue.

13. The method of claim 11, wherein the method further comprises
receiving a plurality of contracts selected by the first entity and associated with the selected triggering event, and
generating a prompt on the display for prompting the user to complete the evaluation when the plurality of events includes the selected triggering event associated with one of the plurality of contracts.

14. The method of claim 11, wherein the method further comprises tracking an age of the evaluation representing a time between automatically prompting the user to complete the evaluation and receiving the completed evaluation and display the age in a user interface.

15. The method of claim 11, wherein the notification to the alertee states why the alert was generated and includes a link that allows the alertee to view the evaluation.

16. The method of claim 11, further comprising tracking an age of the evaluation representing a time between automatically prompting the user to complete the evaluation and receiving the completed evaluation and display the age in a user interface, wherein the generated prompt is presented among other prompts on the display in order of the age.

17. The method of claim 11, wherein the triggering event is a marker indicating the extent to which a contract completion is completed.

18. The method of claim 11, wherein the notification to the alertee states why the alert was generated and includes a link that allows the alertee to view the evaluation.

19. The method of claim 11, wherein the evaluation is customized by both (i) dragging a first question from a layout area in a GUI into a removal area in the GUI to remove it from the evaluation; and (ii) dragging a second question from a first position within in the layout area to a second position in the layout area to define a new order of questions.

20. A non-transitory computer storage-medium having stored thereon instructions that when executed by at least a processor of a computing device cause the processor to:
access, by the processor of the computing device, a plurality of events associated with a construction project, the plurality of events including project data provided by a plurality of entities associated with the construction project during a duration of the construction project, wherein the plurality of events includes completion events of the construction project and accounting events of the construction project,
receive, by at least the processor from a remote device, configuration information selected by a first entity of the plurality of entities for a first event set and a second event set, wherein the configuration information includes
(i) an evaluation including multiple questions customized by the first entity of the plurality of entities at least in part by either dragging a question from a layout area in a GUI into a removal area in the GUI to remove it from the evaluation, wherein the GUI is updated to show the removal of the question in response to the dragging the question into the removal area, or dragging a question from a first position in the layout area to a second position in the layout area to define a new order of questions, wherein the GUI is updated to show the new order of questions in response to the dragging to the second position,
(ii) a triggering event selected by the first entity of the plurality of entities by clicking on a selection mechanism that includes a list of available triggering events, the list of available triggering events including a calendar date, a phase in the construction project, a completion percentage of the construction project, and an occurrence of a field issue,
(iii) a set of one or more evaluators associated with the triggering event selected by the first entity by clicking on a selection mechanism that includes a list of available evaluators, where the selected set of evaluators for the first event set differs from the selected set of advisors for the second event set, and
(iv) an alert threshold associated with a question of the evaluation and an alertee set using a flag selection mechanism;
identify, by at least the processor, when the plurality of events includes the triggering event of the first event set,
in response to the triggering event of the first event set being included in the plurality of events,
(i) generate, by at least the processor, a prompt on a display for prompting the evaluators for the first event set, and not the evaluators for the second event set to complete the evaluation for a second entity of the plurality of entities,
(ii) present each evaluator for the first event set with a user interface for completing the evaluation that includes a status bar specifying at least one of a count of evaluations pending completion by the evaluator, a count of evaluations pending review by the evaluator, and a count of alerts sent to the evaluator,
(iii) receive, by at least the processor, a completed evaluation completed by the evaluators for the first event set at least in part by clicking on a selection mechanism associated with completing the evaluation, and
(iv) automatically determine that the completed evaluation satisfies the alert threshold, and when the completed evaluation satisfies the alert threshold, automatically notify the alertee and cause a portion of the evaluation associated with the alert to be displayed with marks indicating an answer causing the alert; and
generate, by at least the processor, an aggregation of the completed evaluation and transmitting the aggregation to the first entity, the second entity, and a third entity of the plurality of entities.

* * * * *